(12) United States Patent  (10) Patent No.: US 7,841,721 B2
Momose et al.  (45) Date of Patent: Nov. 30, 2010

(54) PROJECTOR WITH A SEALED STRUCTURE HAVING AN AIR-CIRCULATION PATH

(75) Inventors: Yasunaga Momose, Tatsuno-machi (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 663 days.

(21) Appl. No.: 11/896,263

(22) Filed: Aug. 30, 2007

(65) Prior Publication Data

US 2008/0055563 A1 Mar. 6, 2008

(30) Foreign Application Priority Data

Aug. 31, 2006 (JP) .............................. 2006-235658

(51) Int. Cl.
 *G03B 21/18* (2006.01)
(52) U.S. Cl. .......................................... 353/54; 353/61
(58) Field of Classification Search .................... 353/54, 353/61

See application file for complete search history.

(56) References Cited

U.S. PATENT DOCUMENTS

| 6,137,682 | A | 10/2000 | Ishimine et al. | |
| 6,751,027 | B2 * | 6/2004 | Van Den Bossche et al. | 359/634 |
| 6,824,273 | B2 * | 11/2004 | Konuma et al. | 353/61 |
| 7,277,285 | B2 | 10/2007 | Shih et al. | |
| 7,556,383 | B2 * | 7/2009 | Utsunomiya | 353/61 |

FOREIGN PATENT DOCUMENTS

| JP | A-11-271880 | 10/1999 |
| JP | A-2000-049479 | 2/2000 |
| JP | A 2000-162708 | 6/2000 |
| JP | A-2005-121712 | 5/2005 |
| JP | A-2005-303248 | 10/2005 |
| JP | A-2006-208488 | 8/2006 |
| JP | A 2007-41412 | 2/2007 |

* cited by examiner

*Primary Examiner*—Thanh X Luu
(74) *Attorney, Agent, or Firm*—Oliff & Berridge PLC

(57) ABSTRACT

A projector includes: an optical component; a sealed structure within which the optical component casing is disposed, the sealed structure including: a loop air-circulation path in which air is circulated; an optical component casing having an inlet for the air to flow into the optical component casing and an outlet for the air to flow out of the optical component casing; a plurality of ducts that introduces the air into the optical component casing through the inlet and re-introduces the air flowing out of the optical component casing through the outlet into the optical component casing through the inlet; and a heat radiator having a heat-receiving member disposed inside the sealed structure to receive the heat of the air within the sealed structure and a heat-conducting member that penetrates an inside and an outside of the sealed structure, the heat-conducting member having a first end disposed inside the sealed structure and coupled to the heat-receiving member in a heat-transferable manner to transfer the heat of the heat-receiving member to a second end of the heat-conducting member disposed outside the sealed structure; and a circulation fan that circulates the air within the loop air-circulation path.

6 Claims, 22 Drawing Sheets

PROJECTOR WITH A SEALED STRUCTURE HAVING AN AIR-CIRCULATION PATH

The entire disclosure of Japanese Patent Application No. 2006-235658, filed on Aug. 31, 2006, is expressly incorporated by reference herein.

BACKGROUND

1. Technical Field

The present invention relates to a projector.

2. Related Art

A projector that has a light source device, an optical modulator for modulating the light beam irradiated by the light source device in accordance with image information and a projection optical device for projecting the light beam modulated by the optical modulator is known.

When dust, lampblack and the like are adhered on a surface of the optical modulator of the projector, image quality of the projected image is deteriorated. Further, since the optical modulator such as a liquid crystal panel in general is weak against heat, the optical modulator is likely to be degraded by heat-generation on account of the light beam irradiated from the light source device.

In order to ensure stable image quality of the projected image and efficiently cool the optical modulator, a mechanism has been proposed, where an optical modulator is disposed within a sealed structure and the air inside the sealed structure is circulated by a circulation fan (see, for instance, JP-A-2000-162708).

No component for cooling the air inside the sealed structure is provided in the mechanism described in the above document. Instead, a sealed box, a head and pipe members constituting the sealed structure are provided by metal material, so that the heat of the air inside the sealed structure is radiated to the outside through the metal components. According to the mechanism, however, it is difficult to secure sufficient heat-radiating area and efficiently cool the air inside the sealed structure. In other words, it is difficult to efficiently cool the optical components such as the optical modulator and the like.

Accordingly, there has been a demand for a technique that can ensure stable image quality of projected image for a long time and efficiently cool the optical components such as the optical modulators.

SUMMARY

An object of the invention is to provide a projector that can secure image quality of projected image for a long time and efficiently cool an optical component.

A projector according to an aspect of the invention includes: an optical component disposed within a sealed structure having a loop air-circulation path in which air is circulated; and a circulation fan that circulates the air within the loop air-circulation path, the sealed structure comprising: an optical component casing having an inlet for the air to flow into the optical component casing and an outlet for the air to flow out of the optical component casing; a plurality of ducts that re-introduces the air flowing out of the optical component casing through the outlet into the optical component casing through the inlet; and a heat radiator having a heat-receiving member disposed inside the sealed structure to receive the heat of the air within the sealed structure and a heat-conducting member that penetrates an inside and an outside of the sealed structure, the heat-conducting member having a first end disposed inside the sealed structure and coupled to the heat-receiving member in a heat-transferable manner to transfer the heat of the heat-receiving member to a second end of the heat-conducting member disposed outside the sealed structure.

The heat-conducting member may utilize any one of so-called thermal conduction where the heat is transferred within the heat-conducting member without accompanying mass transfer and convection heat transfer where heat is transferred in accordance with a movement of internal coolant.

According to the present invention, since the optical component such as an optical modulator and the like is housed within the optical component casing constituting the sealed structure, adhesion of dust, lampblack and the like on the optical component can be prevented and stable image quality of image projected by a projector can be ensured for a long time.

The heat radiator of the sealed structure includes the heat-receiving member and the heat-conducting member and the heat of the air within the sealed structure is received by the heat-receiving member and the heat received by the heat-receiving member is transferred from the inside of the sealed structure to the outside of the sealed structure by the heat-conducting member. Accordingly, the heat of the air inside the sealed structure can be transferred to the outside of the sealed structure by the heat radiator, so that the air within the sealed structure can be efficiently cooled. The optical components such as the optical modulator and the like can also be efficiently cooled.

Accordingly, stable image quality of projected image can be secured for a long time and optical components can be efficiently cooled, thus satisfying an object of the invention.

Further, it is not necessary to form the component of the sealed structure with metal material unlike usual arrangement, so that the weight of the projector itself can be reduced.

When the second end of the heat-conducting member is installed to a vacant space inside the projector and the second end of the heat-conducting member is cooled at the vacant space, the mechanism for cooling the second end of the heat-conducting member can be freely located, so that design freedom of the projector can be enhanced.

In the projector according to the above aspect of the invention, the heat-conducting member is preferably a heat-pipe including a tube; a capillary structure provided in the tube; and a coolant housed within the tube, the coolant circulating in the tube to transfer the heat within the heat-conducting member.

The capillary structure may be provided in various forms, which includes extra-fine line wick of a plurality of fine copper lines and the like, net-like metal mesh wick, groove-wick in which a plurality of grooves are formed inside the tube and sintered wick of powder form.

According to the present invention, the heat-conducting member is made of heat-pipe using circulation of coolant. Accordingly, for instance, as compared with an arrangement in which a heat-conducting member utilizing thermal conduction is used as the heat-conducting member, the heat resistance between the first end (evaporative portion) and the second end (condensing portion) becomes closer to zero, so that approximately the same cooling effect as direct cooling of the first end can be obtained by cooling the second end. In other words, the heat transfer within the heat-conducting member can be rapidly conducted, thereby improving the cooling efficiency of the air within the sealed structure.

Further, by providing the respective heat-conducting member with a heat pipe, any attitude of the projector such as normal-mount attitude (mounted on a setting surface on a desk, for instance), hang attitude (suspended from ceiling and the like to be upside down relative to the normal-mount attitude) and inclined attitude in order to adjust the position of the projected image, is possible while keeping excellent cooling efficiency of the air within the sealed structure.

In the projector according the above aspect of the invention, the capillary structure of the heat-conducting member is preferably provided by a sintered wick.

According to the above arrangement, since the capillary structure of the heat-conducting member is formed by sintered wick, the heat resistance between the first end and the second end can be set sufficiently low as compared with the other wick (extra-fine line wick, metal mesh wick, groove wick and the like) and the heat can be efficiently transferred to the coolant by virtue of the excellent heat conductivity of the wick itself. Accordingly, heat transfer within the heat-conducting member can be more rapidly conducted and the cooling efficiency of the air within the sealed structure can be further improved.

In the projector according to the above aspect of the invention, the plurality of ducts preferably includes a flow-path downstream duct that is connected with the outlet of the optical component casing, and the heat-receiving member is preferably disposed within the flow-path downstream duct at a position planarly interfering with the discharge outlet.

According to the above arrangement, since the heat-receiving member is disposed within the flow-path downstream duct at a position planarly interfering with the outlet, the air heated by the optical component is directly blown to the heat-receiving member. In other words, after the heat of the air immediately after being heated by the optical component is received by the heat-receiving member, the heat is transferred to the outside of the sealed structure by the heat-conducting member, so that temperature raise of the air within the sealed structure can be reduced and the air can be efficient cooled.

In the projector according to the above aspect of the invention, the sealed structure preferably includes a plurality of sealed structures, each of the plurality of sealed structures mutually independently defining the air-circulation path.

Any arrangement is possible for the plurality of sealed structures as long as each of the sealed structures is provided with mutually independent air-circulation path, where at least one of the components (the optical component casing, for instance) may be used as a common component.

Incidentally, when a plurality of optical components of which heat values are different are placed within the same air-circulation path, it is difficult to efficiently cool the respective optical components on account of heat transfer and thermal interference from the other optical component.

In the present invention, the plurality of sealed structures are provided. Accordingly, by providing a plurality of optical components of which heat values are different respectively within the mutually independent air-circulation paths of the sealed structures, heat transfer and thermal interference by the other optical component can be prevented and the plurality of optical components can be efficiently cooled by the air flowing through the air-circulation paths.

In the projector according to the aspect of the invention, the heat radiator preferably includes a heat-radiating member that is coupled to the second end of the heat-conducting member to radiate the heat transferred via the heat-conducting member, and the heat radiators of the plurality of sealed structures preferably have the heat-radiating member in common.

According to the above aspect of the invention, since the heat radiator includes the heat-radiating member coupled to the second side of the heat-conducting member, the heat transferred to the second end of the heat-conducting member can be further efficiently radiated by the heat-radiating member. Further, since the heat-radiating member of the plurality of heat radiators is provided by the same heat-radiating member, as compared with an arrangement in which the respective heat radiators are provided with separate heat-radiating members, the component can be omitted by employing the heat-radiating member as a common component, thereby reducing production cost, size and weight of the projector.

In the projector according to the above aspect of the invention, the sealed structure preferably include a heat exchanger including: a heat-receiving-side heat-conductive member that faces the inside of the sealed structure and receives the heat of the air within the sealed structure; and heat-radiating-side heat-conductive member that faces the outside of the sealed structure and is coupled with the heat-receiving-side heat-conductive member in a heat-transferable manner to radiate the heat of the heat-receiving-side heat-conductive member to the outside of the sealed structure.

According to the above aspect of the invention, since the sealed structure includes the heat exchanger having the heat-receiving-side heat-conductive member and the heat-radiating-side heat-conductive member, the air within the sealed structure can be further efficiently cooled with the use of both of the heat radiator and the heat exchanger.

In the projector according to the above aspect of the invention, the sealed structure preferably include a heat exchanger including: a heat-receiving-side heat-conductive member that faces the inside of the sealed structure and receives the heat of the air within the sealed structure; and heat-radiating-side heat-conductive member that faces the outside of the sealed structure and is coupled with the heat-receiving-side heat-conductive member in a heat-transferable manner to radiate the heat of the heat-receiving-side heat-conductive member to the outside of the sealed structure, and the second end of the heat-conducting member of the heat radiator is preferably coupled to the heat-radiating-side heat-conductive member in a heat-transferable manner.

According to the above aspect of the invention, since the sealed structure includes the heat exchanger having the heat-receiving-side heat-conductive member and the heat-radiating-side heat-conductive member, the air within the sealed structure can be further efficiently cooled with the use of both of the heat radiator and the heat exchanger.

Since the second end of the heat-conducting member of the heat radiator is coupled with the heat-radiating-side heat-conductive member in a heat-transferable manner, the mechanism for cooling the second end of the heat-conducting member and the mechanism for cooling the heat-receiving-side heat-conductive member of the heat exchanger can be constructed by the same component, so that, as compared with an arrangement where, for instance, the heat radiator has a unique heat-radiating member connected with the second end of the heat-conducting member, the component can be omitted and the production cost, size and weight of the projector can be reduced.

In the projector of the above aspect of the invention, the heat-radiating-side heat-conductive member preferably includes a plurality of fins, and the heat exchanger preferably includes a cooling fan that delivers cooling air toward the plurality of fins or inhales the air near the plurality of fins.

According to the above aspect of the invention, since the heat exchanger include the cooling fan and the cooling fan cools the plurality of fins of the heat-radiating-side heat-conductive member, heat exchanger's cooling efficiency of the air within the sealed structure can be further improved.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

Figure 1:
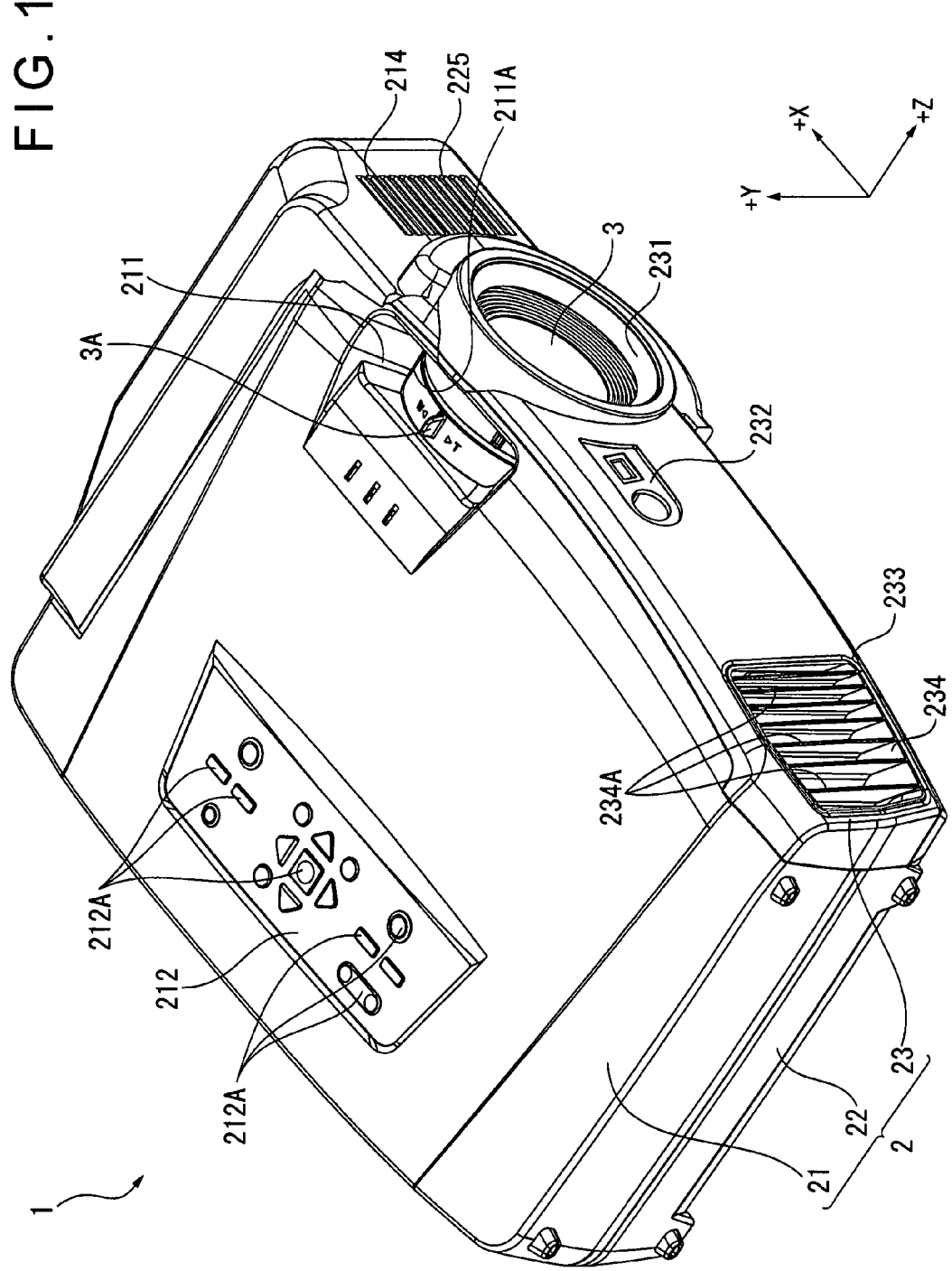
FIG. 1 is a perspective view showing an exterior of a projector according to a first exemplary embodiment.
Figure 2:
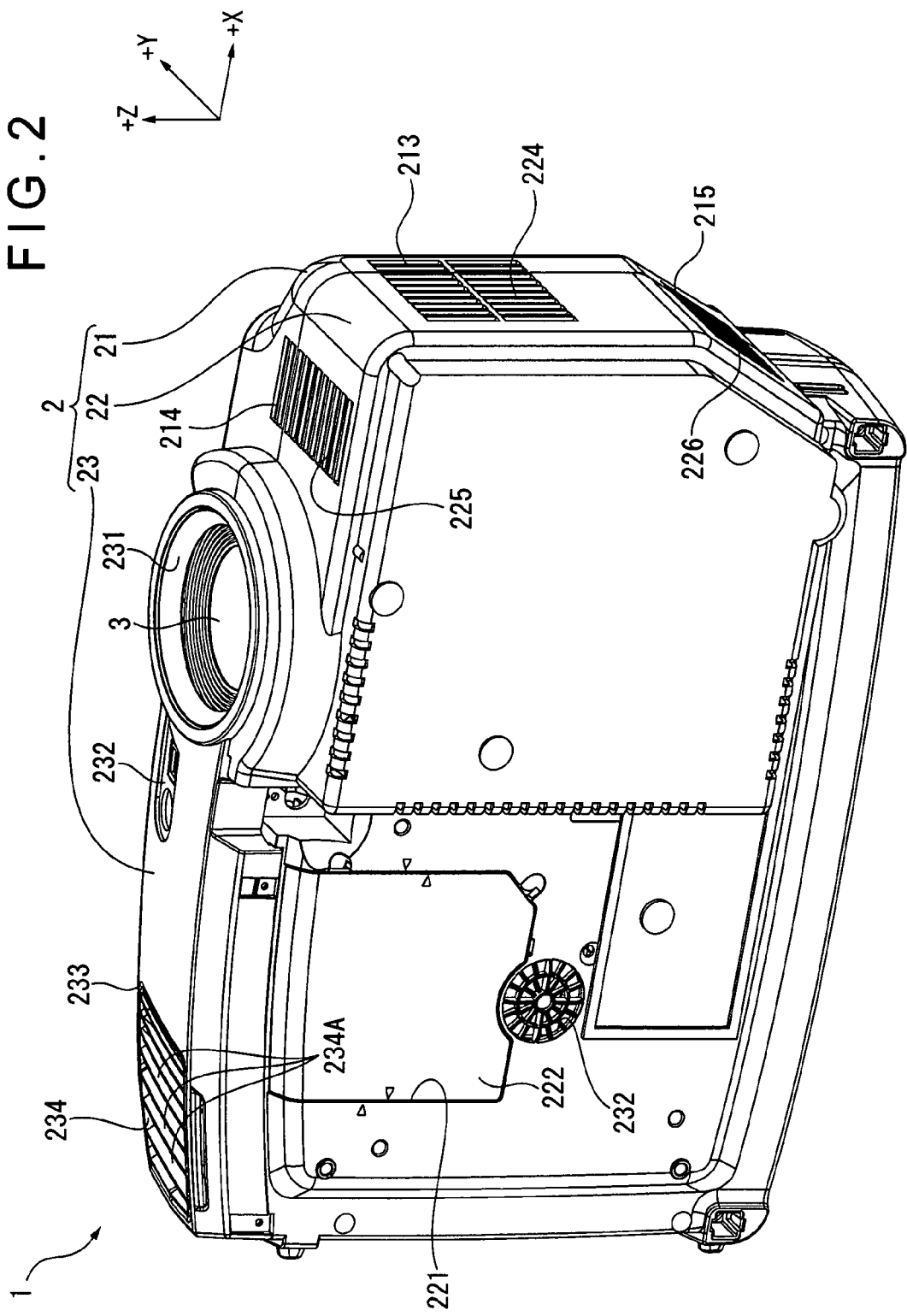
FIG. 2 is another perspective view showing the exterior of the projector according to the aforesaid embodiment.

A first exemplary embodiment of the invention will be described below with reference to the attached drawings.
Exterior Arrangement FIGS. 1 and 2 are perspective views showing an exterior of a projector 1 according to the first exemplary embodiment. Specifically, FIG. 1 is a perspective view showing the upper front side of the projector 1. FIG. 2 is a perspective view showing the lower front side of the projector 1. In FIG. 1, for the convenience of explanation, a projecting direction of an optical image is set as Z-axis and two axes orthogonal to –Z-axis are respectively set as X-axis (horizontal axis) and Y-axis (vertical axis), which applies in the rest of the drawings.

The projector 1 modulates a light beam irradiated by a light source in accordance with image information to form an optical image and projects the formed optical image on a screen (not shown) in an enlarged manner. As shown in FIGS. 1 and 2, the projector 1 includes a substantially rectangular parallelepiped exterior casing 2 and a projection lens 3 (a projection optical device) exposed from the exterior casing 2.

The projection lens 3 is a lens set including a plurality of lenses housed in a cylindrical lens barrel, the projection lens 3 projecting the optical image modulated by the device body of the projector 1 in an enlarged manner in accordance with the image information. The projection lens 3 includes a lever 3A (FIG. 1) that changes a relative position of the plurality of lenses so that focus and magnification of the projected optical image can be adjusted.

The exterior casing 2 is made of synthetic resin and houses the device body of the projector 1. As shown in FIGS. 1 and 2, the exterior casing 2 includes an upper case 21 that covers the upper side and a part of the front side, lateral side and rear side of the device body, a lower case 22 that covers the lower side and a part of the front side, lateral side and rear side of the device body, and a front case 23 that covers a part of the front side of the device body.

A recess 211 dented toward the inside of the exterior casing 2 is provided on the upper side of the upper case 21 in +X-axis direction (right side from the front side) as shown in FIG. 1. An opening 211A penetrating into the inside is provided at the bottom of the recess 211. The lever 3A of the projection lens 3 is exposed through the opening 211A to allow an operation on the lever 3A.

As shown in FIG. 1, an operation panel 212 for power-on and adjustment operations of the projector 1 is provided approximately at the center (in plan view) of the upper side of the upper case 21 to be extended in right and left directions. Once pushed, operation buttons 212A of the operation panel 212 are brought into contact with tactile switches disposed thereinside and mounted on a circuit board (not shown) to achieve desired operations.

Note that, the circuit board of the operation panel 212 described above is electrically coupled to the below-described control board, so that operation signals generated by pressing of the operation buttons 212A are output to the control board.

Though not specifically shown, a power-source air inlet that intercommunicates the inside and the outside of the exterior casing 2 is provided on –X-axis side (right side from the rear side) of the rear side of the upper case 21. The power-source air inlet is an opening for taking cooling air outside the exterior casing 2 into the inside of the exterior casing 2. The cooling air outside the exterior casing 2 is introduced into the inside of the exterior casing 2 through the power-source air inlet by an intra-casing cooling device (described below) constituting the device body inside the exterior casing 2 to be delivered to a power source unit constituting the device body.

Further, as shown in FIG. 2, a heat-exchanger air inlet 213 that intercommunicates the inside and the outside of the exterior casing 2 is provided on +Z-axis side (front side) of +X-axis side of the upper case 21. The heat-exchanger air inlet 213 is an opening for taking cooling air outside the exterior casing 2 into the inside of the exterior casing 2. The cooling air outside the exterior casing 2 is introduced into the inside of the exterior casing 2 through the heat-exchanger air inlet 213 by a heat exchanger (described below) constituting the device body inside the exterior casing 2 to be delivered to a heat-radiating-side of a heat exchanger body of the heat exchanger.

A first heat-exchanger exhaust hole 214 intercommunicating the inside and the outside of the exterior casing 2 is provided on +X-axis side of the front side of the upper case 21 as shown in FIGS. 1 and 2. The first heat-exchanger exhaust hole 214 is an opening for exhausting the air introduced into the inside of the exterior casing 2 through the heat-exchanger air intake 213 and delivered to the heat-radiating-side of the heat exchanger body toward the outside of the exterior casing 2.

Further, as shown in FIG. 2, a second heat-exchanger air inlet 215 that intercommunicates the inside and the outside of the exterior casing 2 is provided on −Z-axis side (rear side) of +X-axis side of the upper case 21. Similar to the first heat-exchanger exhaust hole 214, the second heat-exchanger exhaust hole 215 is an opening for exhausting the air introduced into the inside of the exterior casing 2 through the heat-exchanger air intake 213 and delivered to the heat-radiating-side of the heat exchanger body toward the outside of the exterior casing 2.

As shown in FIG. 2, a rectangular (in plan view) opening 221 is provided on −X-axis side of the bottom side of the lower case 22. A rectangular (in plan view) plate-shaped lid 222 is detachably attached to the opening 221.

Though not specifically illustrated, when the lid 222 is detached from the lower case 22, a part of the light source device (described below) constituting the device body inside the exterior casing 2 is exposed to allow exchange of the light source device through the opening 221.

Further, as shown in FIG. 2, a light-source air inlet 223 is formed on −Z-axis side of the bottom side of the lower case relative to the opening 221. The light-source air inlet 223 is an opening for taking cooling air outside the exterior casing 2 into the inside of the exterior casing 2. The cooling air outside the exterior casing 2 is introduced into the inside of the exterior casing 2 through the light-source air inlet 223 by an intra-casing cooling device (described below) constituting the device body inside the exterior casing 2 to be delivered to the light source device.

Further, as shown in FIG. 2, a heat-exchanger air inlet 224 that intercommunicates the inside and the outside of the exterior casing 2 is provided on +Z-axis side of +X-axis side of the lower case 22. Similarly to the heat-exchanger air inlet 213 provided on the upper case 21, the heat-exchanger air inlet 224 is also an opening that takes the cooling air outside the exterior casing 2 into the inside of the exterior casing 2 by the heat exchanger.

A first heat-exchanger exhaust hole 225 intercommunicating the inside and the outside of the exterior casing 2 is provided on +X-axis side of the front side of the lower case 22 as shown in FIGS. 1 and 2. Similar to the first heat-exchanger exhaust hole 214 provided on the upper case 21, the first heat-exchanger exhaust hole 225 is an opening for exhausting the air introduced into the inside of the exterior casing 2 through the heat-exchanger air intakes 213 and 224 and delivered to the heat-radiating-side of the heat exchanger body toward the outside of the exterior casing 2.

Further, as shown in FIG. 2, a second heat-exchanger air inlet 226 that intercommunicates the inside and the outside of the exterior casing 2 is provided on −Z-axis side of +X-axis side of the lower case 22. Similar to the second heat-exchanger exhaust hole 215 provided on the upper case 21, the second heat-exchanger exhaust hole 226 is an opening for exhausting the air introduced into the inside of the exterior casing 2 through the heat-exchanger air intakes 213 and 224 and delivered to the heat-radiating-side of the heat exchanger body toward the outside of the exterior casing 2.

A power-source air inlet 227 (see FIG. 5) that intercommunicates the inside and the outside of the exterior casing 2 is provided on −X-axis side of the rear side of the lower case 22. Similarly to the power-source air inlet provided on the upper case 21, the power-source air inlet 227 is an opening for delivering the cooling air outside the exterior casing 2 toward the internal power-source unit through the power-source air inlet 227 by the intra-casing cooling device.

As shown in FIGS. 1 and 2, a circular hole 231 is formed on +X-axis side of the front case 23, through which a tip end of the projection lens 3 is exposed. In other words, the optical image is projected in an enlarged manner from the projection lens 3 through the circular hole 231.

As shown in FIG. 1 or 2, a remote controller light-receiving window 232 is provided approximately at the center in −X-axis direction of the front case 23. A remote controller light-receiving module (not shown) that receives an operation signal from a remote controller (not shown) is disposed on the inside of the remote controller light-receiving window 232.

Operation units similar to power-on switch and adjusting switch provided on the above-mentioned operation panel 212 are provided on the remote controller. When the remote controller is operated, an infrared signal corresponding to the operation is output from the remote controller, which is received by the remote controller light-receiving module through the remote controller light-receiving window 232 to be processed by a control board (described below).

Further, as shown in FIGS. 1 and 2, an exhaust hole 233 for discharging the air inside the exterior casing 2 toward the outside is provided on −X-axis side of the front case 23. A louver 234 having grid arrangement of a plurality of rectifying plates 234A is provided on the exhaust hole 233 as shown in FIGS. 1 and 2. As shown in FIGS. 1 and 2, the plate surface of the plurality of rectifying plates 234A is inclined by a predetermined angle relative to YZ plane in a direction away from the projection lens 3. The air inside the exterior casing is exhausted through the exhaust hole 233 and the louver 234 after being rectified in a direction away from the projection lens 3 by the intra-casing cooling device.

Internal Arrangement

Figure 3:
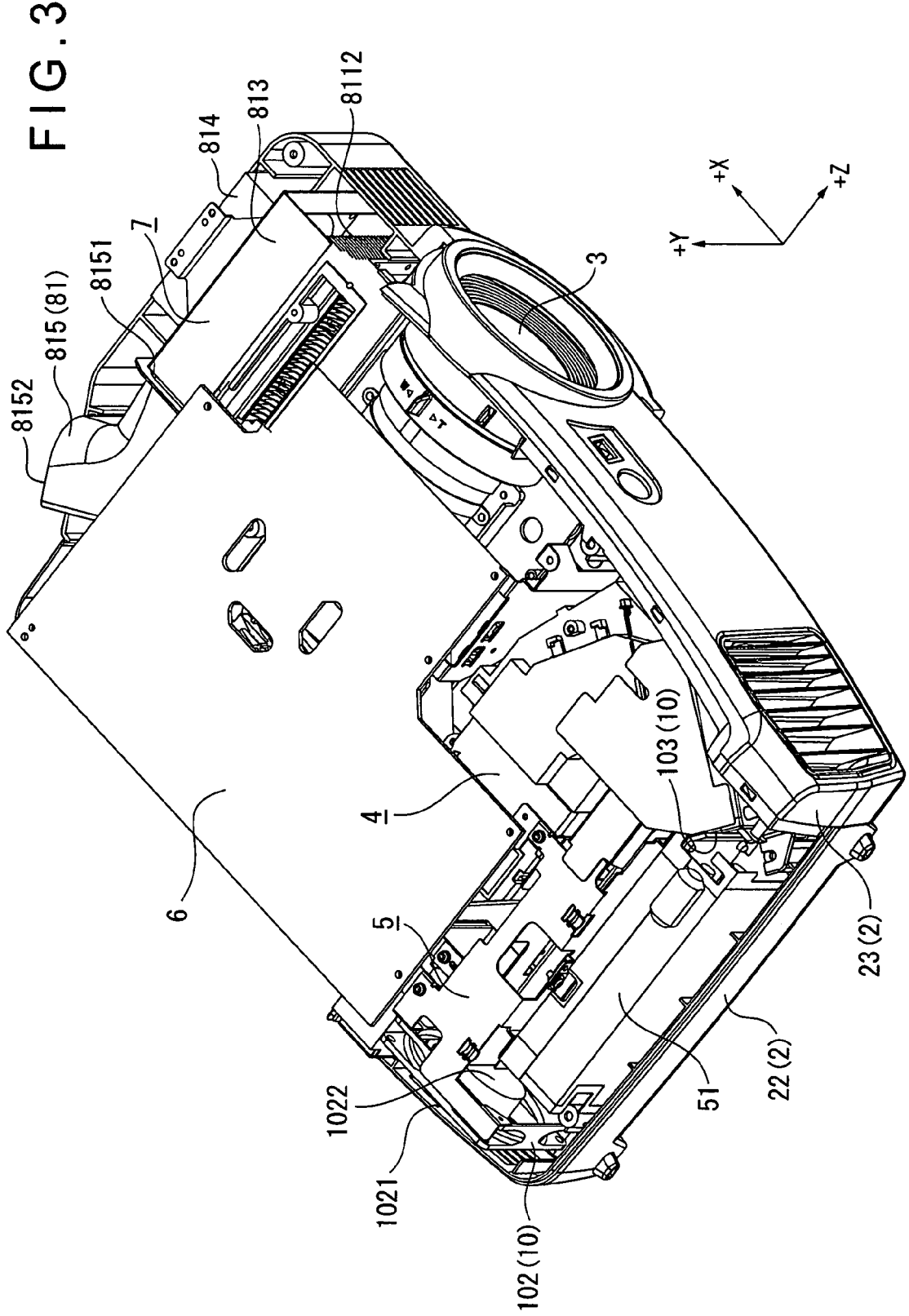
FIG. 3 is an illustration showing an interior arrangement of the projector of the aforesaid embodiment.
Figure 4:
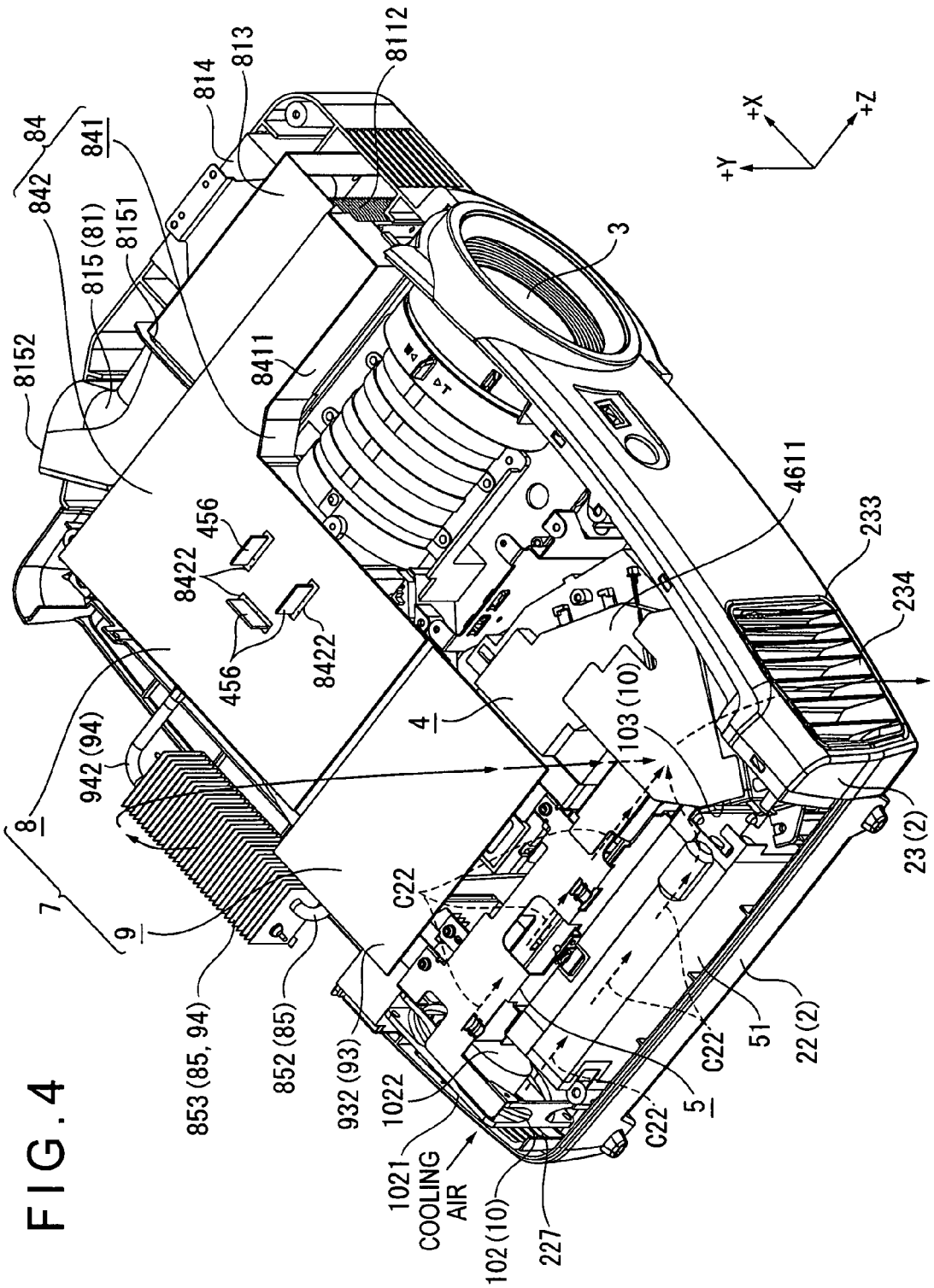
FIG. 4 is another illustration showing the interior arrangement of the projector of the aforesaid embodiment.
Figure 5:
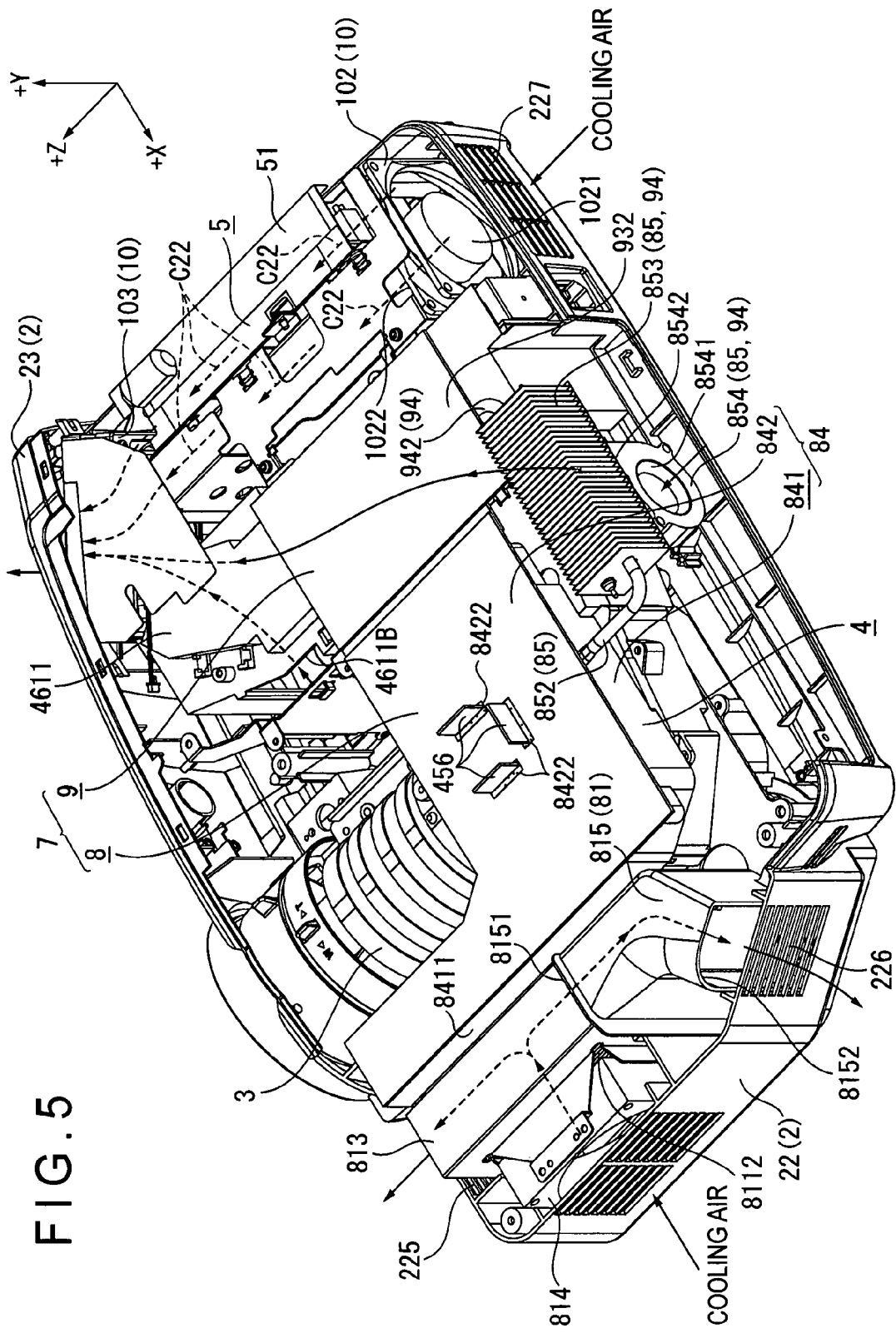
FIG. 5 is still another illustration showing the interior arrangement of the projector of the aforesaid embodiment.
Figure 6:
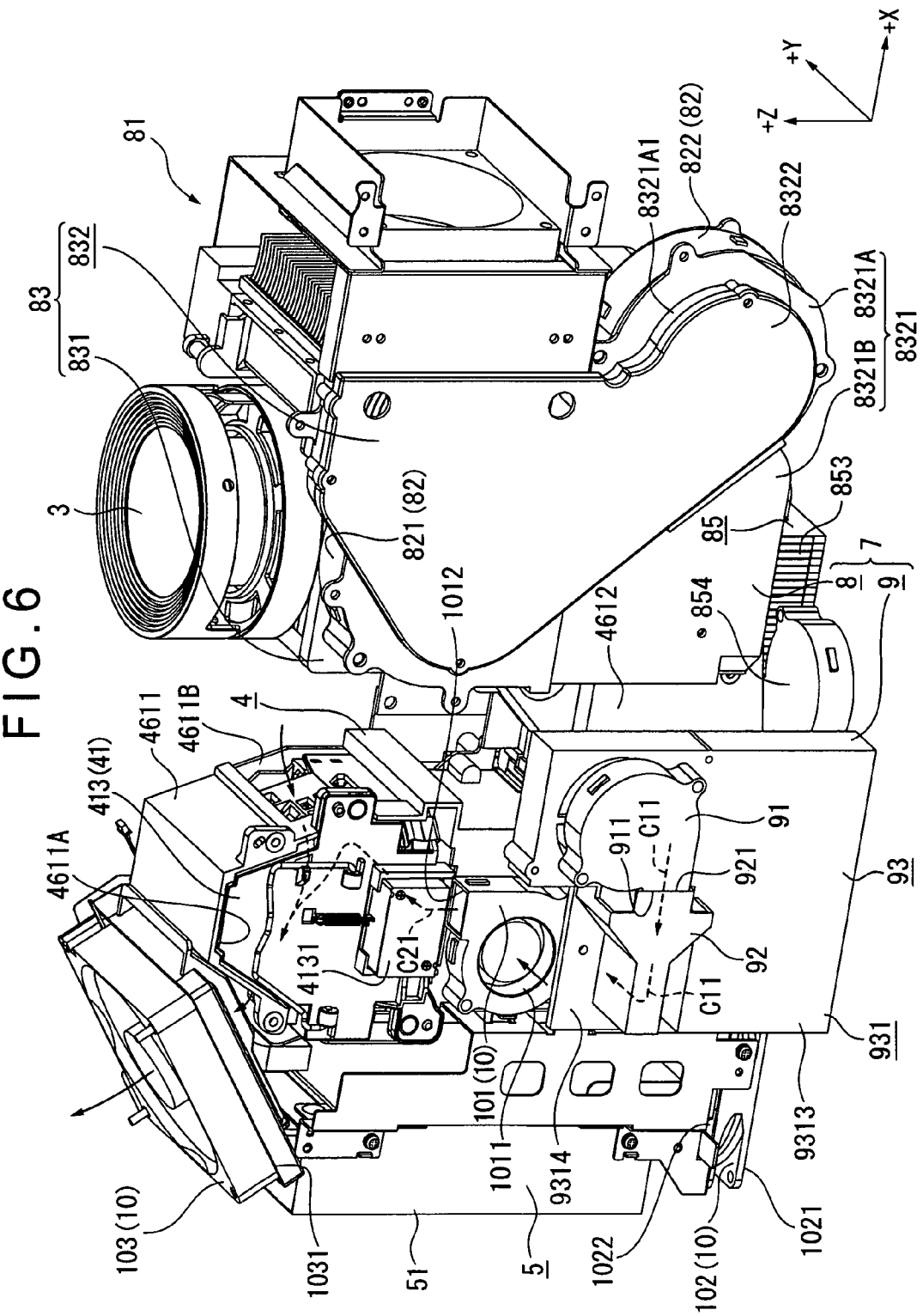
FIG. 6 is a further illustration showing the interior arrangement of the projector of the aforesaid embodiment.
Figure 7:
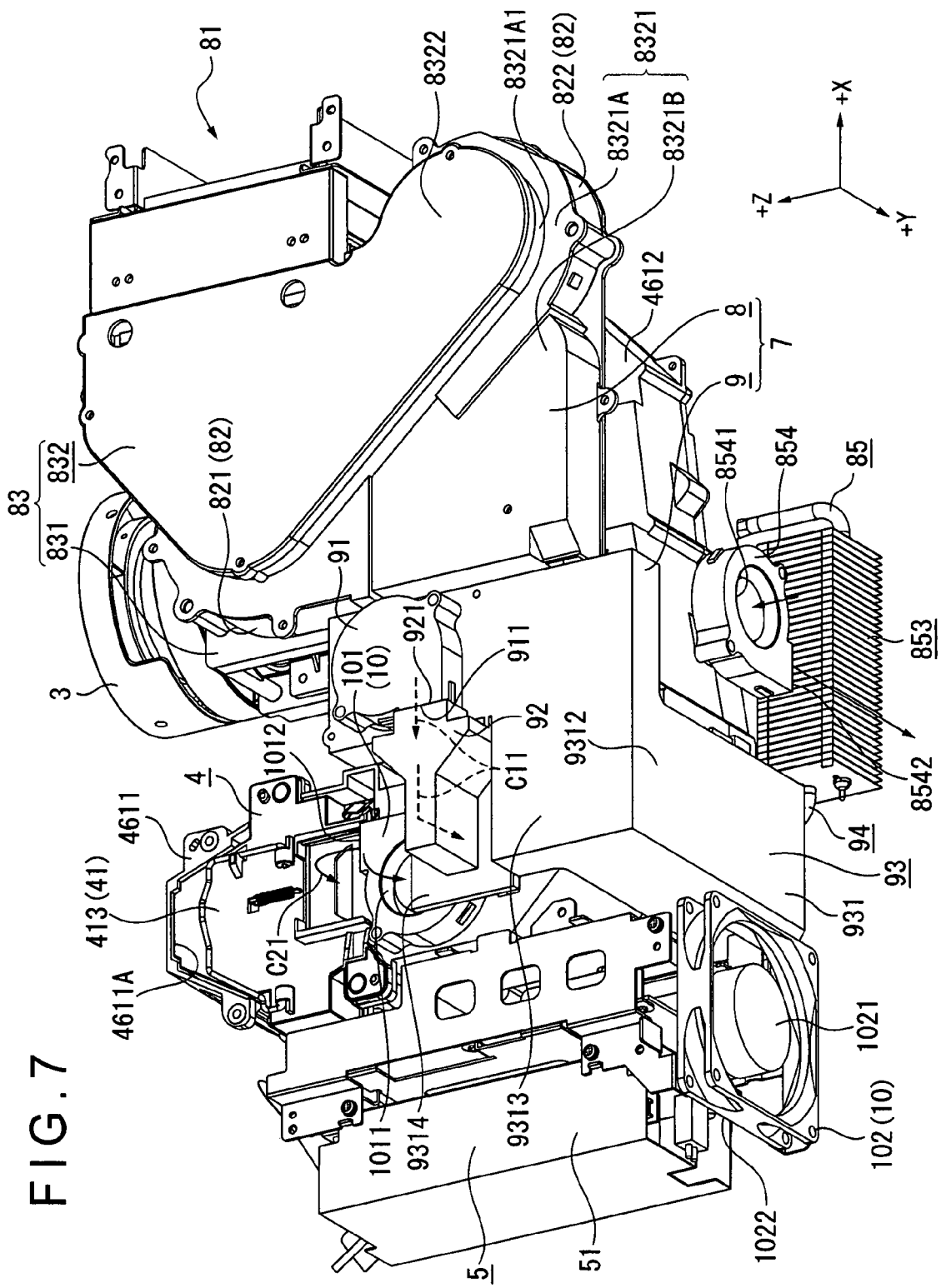
FIG. 7 is still further illustration showing the interior arrangement of the projector of the aforesaid embodiment.

FIGS. 3 and 7 are illustrations each showing the interior arrangement of the projector 1. Specifically, FIG. 3 is an illustration in which the upper case 21 is removed from the state shown in FIG. 1. FIG. 4 is an illustration in which the control board 6 is removed from the state shown in FIG. 3. FIG. 5 is a perspective view showing rear-side of what is shown in FIG. 4. FIG. 6 is a perspective view showing lower front side of the device body (except for the control board 6) of the projector 1. FIG. 7 is a perspective view showing rear-side view of what is shown in FIG. 6.

As shown in FIGS. 3 to 7, the device body of the projector 1 is housed within the exterior casing 2. The device body includes an optical unit 4, a power source unit 5, a control board 6 (FIG. 3), a sealed circulation air-cooling unit 7 and an intra-casing cooling device 10.

Arrangement of Optical Unit

Figure 8:
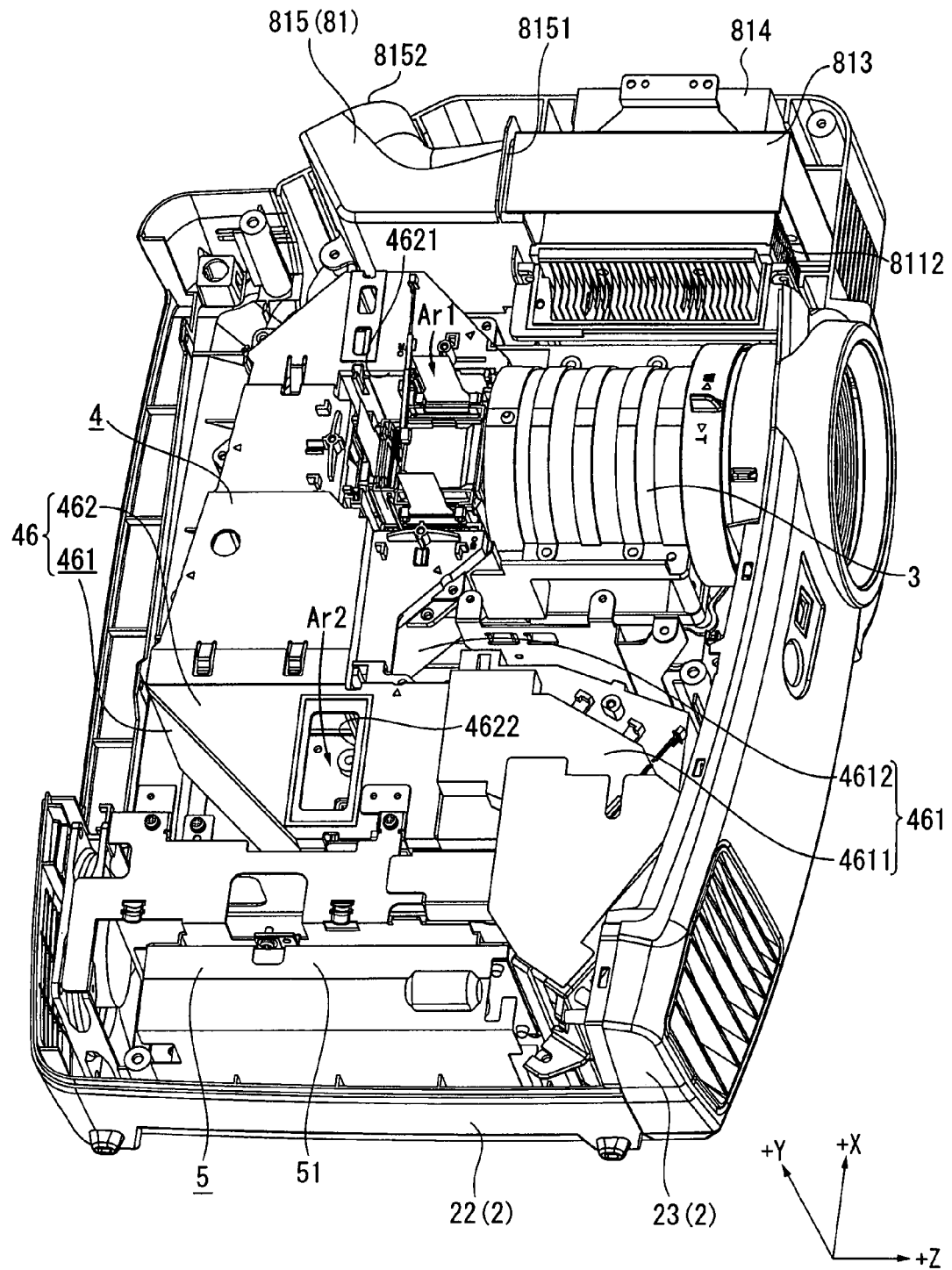
FIG. 8 is an illustration showing an optical unit of the aforesaid embodiment.
Figure 9:
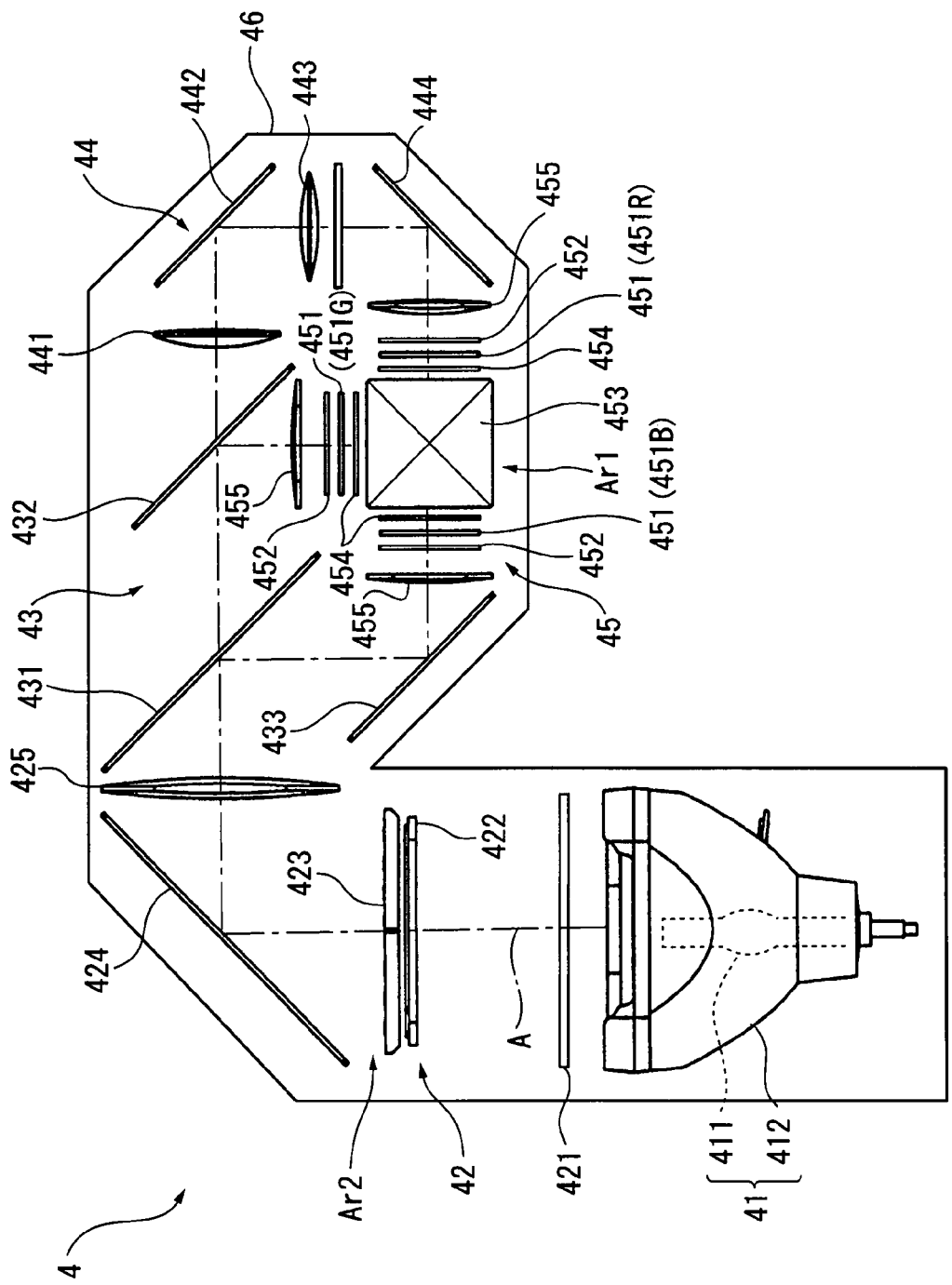
FIG. 9 is another illustration showing the optical unit of the aforesaid embodiment.

FIGS. 8 and 9 are illustrations each showing the arrangement of the optical unit 4. Specifically, FIG. 8 is an illustration showing a state where a part of the sealed circulation air-cooling unit 7 (heat radiators 85 and 94, flow-path downstream ducts 84 and 93 and the like) is removed from those shown in FIG. 4. FIG. 9 is a plan view showing an optical system of the optical unit 4.

The optical unit 4 forms an image light in accordance with the image information under the control of the control board 6. As shown in FIG. 8, the optical unit 4 is shaped in an approximate U-shape (in plan view) that extends in Z-axis direction from the front side to the rear side of the exterior casing 2; further bends and extends in +X-axis direction at −Z-axis end; and further extends in +Z-axis direction after being bent. As shown in FIG. 9, the optical unit 4 includes a light source device 41, an integrator illumination optical system 42, a color-separating optical system 43, a relay optical system 44, an optical device 45 and an optical component casing 46.

The light source device 41 irradiates the light beam emitted by a light source lamp 411 and aligns the light beam in a predetermined direction to illuminate the optical device 45. As shown in FIG. 9, the light source device 41 includes the light source lamp 411, a reflector 412 and a lamp housing 413 (FIGS. 6 and 7) that holds the light source lamp 411 and the reflector 412. The light source device 41 is housed within a light source housing 4611 (FIGS. 6 to 8) that is connected with the optical component casing 46. Once being housed within the light source housing 4611, the light source device 41 is positioned at a predetermined position (a position where the center axis of the light beam irradiated from the light source device 41 coincides with an illumination optical axis A defined within the optical component casing 46) relative to the optical component casing 46.

A halogen lamp, a metal halide lamp and a high-pressure mercury lamp are usually used for the light source 411.

A parabolic reflector that substantially parallelizes and reflects the light beam emitted by the light source lamp 411 is used for the reflector 412. As an alternative to the parabolic reflector, the reflector 412 may be a combination of an ellipsoidal reflector that reflects the light beam emitted by the light source lamp 411 to be converged at a predetermined point and a parallelizing lens.

The integrator illumination optical system 42 is an optical system that divides the light beam emitted by the light source device 41 into a plurality of sub-beams to equalize an in-plane illuminance of the illuminated area. As shown in FIG. 9, the integrator illumination optical system 42 includes a first lens array 421, a second lens array 422, a polarization converter 423, a reflection mirror 424 and a superposing lens 425.

The first lens array 421 is a light-beam-splitting optical element that splits the light beam irradiated from the light source device 41 into a plurality of sub-beams. The first lens array 421 includes a plurality of small lenses arranged in a matrix in a plane orthogonal to the illumination optical axis A.

The second lens array 422 is an optical element that condenses the plurality of sub-beams split by the above-mentioned first lens array 421. Similarly to the first lens array 421, the second lens array 422 has a plurality of small lenses arranged in a matrix in a plane orthogonal to the illumination optical axis A.

The polarization converter 423 aligns polarizing direction of the respective sub-beams split by the first lens array 421 into a substantially unidirectional linear polarization.

Though not illustrated, the polarization converter 423 has an alternating arrangement of polarization separation films and reflection films that are inclined relative to the illumination optical axis A. The polarization separation film transmits one of the P-polarization light and S-polarization light contained in the respective sub-beams and reflects the other polarization light. The other reflected polarization light is bent by the reflection film to be irradiated in irradiating direction of the one of the polarization light (i.e. in a direction along the illumination optical axis A). Either one of the irradiated polarization lights is polarization-converted by a retardation plate provided on the light-irradiating side of the polarization converter 423 to align polarizing direction of approximately all of the polarization lights. Since the light beam irradiated by the light source device 41 can be aligned as a substantially unidirectional polarization beam with the use of the polarization converter 423, the utilization efficiency of the source light used in the optical device 45 can be improved.

The superposing lens 425 is an optical element that condenses and superposes the plurality of sub-beams passing through the first lens array 421, the second lens array 422, the polarization converter 423 and the reflection mirror 424 onto image formation areas on three liquid crystal panels (described below) of the optical device 45.

As shown in FIG. 9, the color-separating optical system 43 has two dichroic mirrors 431 and 432, and a reflection mirror 433. The color-separating optical system 43 separates the plurality of sub-beams irradiated from the integrator illuminating optical system 42 by the dichroic mirrors 431 and 432 into three color lights of red (R), green (G) and blue (B).

The dichroic mirrors 431 and 432 are optical elements provided on a base thereof with a wavelength-selective film that reflects light beam of a predetermined wavelength and transmits light beam of the other wavelength. The dichroic mirror 431 disposed on the upstream of the optical path is a mirror that reflects blue light and transmits the other color lights. The dichroic mirror 432 disposed on the downstream of the optical path is a mirror that reflects green light and transmits red light.

As shown in FIG. 9, the relay optical system 44 includes an incident-side lens 441, a relay lens 443, and reflection mirrors 442, 444. The relay optical system 44 guides the red light passing through the dichroic mirrors 431 and 432 of the color-separating optical system 43 toward the optical device 45. Note that the relay optical system 44 is provided on the optical path of the red light in order to avoid deterioration in the light utilization efficiency on account of light dispersion and the like caused by the longer length of the optical path of the red light than the optical paths of the other color lights. Though the above arrangement is employed in the present embodiment because the red-light optical path is long, it is possible to lengthen the blue-light optical path and provide the relay optical system 44 on the blue-light optical path.

The blue light separated by the above-described dichroic mirror 431 is bent by the reflection mirror 433 to be supplied to the optical device 45 through a field lens 455. The green light separated by the dichroic mirror 432 is directly supplied to the optical device 45 through the field lens 455. The red light is condensed and bent by the lenses 441 and 443 of the relay optical system 44 and the reflection mirrors 442 and 444 to be supplied to the optical device 45 through the field lens 455. The field lens 455 provided on the upstream of the optical path of the respective color lights of the optical device 45 is for converting the sub-beams irradiated from the second lens array 422 into light beams parallel to the main beam of the sub-beams.

The optical device 45 modulates the incident light beam in accordance with image information to form a color image. As shown in FIG. 9, the optical device 45 includes three liquid crystal panels 451 (optical modulator to be illuminated: the liquid crystal panel on the red-light side is denoted as 451R, the liquid crystal panel on the green-light side is denoted as 451G and the liquid crystal panel on the blue-light side is denoted as 451B), and a cross dichroic prism 453. The incident-side polarization plate 452 is interposed between the field lens 455 and the respective liquid crystal panels 451 and on irradiation-side polarization plate 454 is interposed between the liquid crystal panels 451 and the cross dichroic prism 453. The incident-side polarization plate 452, the liquid crystal panel 451 and the irradiation-side polarization plate 454 modulate the respective color lights incident thereon.

The liquid crystal panel 451 is a component in which liquid crystal (electro-optic material) is sealed between a pair of transparent glass substrates. The liquid crystal panel 451 uses, for instance, a polysilicon TFT (Thin Film Transistor) as a switching element to modulate the polarizing direction of the polarization light irradiated from the incident-side polarization plate 452 in accordance with an applied image signal.

The cross dichroic prism 453 is an optical element for combining optical images that have been modulated for each color light irradiated from the irradiation-side polarization plate 454 to form a color image. The cross dichroic prism 453 is substantially square in plan view formed by attaching four right-angle prisms, and dielectric multi-layer films are formed on the boundaries where the right-angle prisms are attached to each other. One of the dielectric multi-layer films reflects red light and the other dielectric multi-layer film reflects blue light. Thus, the dielectric multi-layer films bend the red light and the blue light to be aligned with the advancing direction of the green light, thereby combining the three color lights.

As shown in FIGS. 8 and 9, the optical component casing 46 has a U-shape in plan view. A predetermined illumination optical axis A (FIG. 9) is defined inside the casing 46 and the optical systems 41 to 45 are disposed at a predetermined position relative to the illumination optical axis A. The optical component casing 46 includes a component housing 461 and a lid member 462 as shown in FIG. 8.

As shown in FIG. 8, the component housing 461 includes the light source housing 4611 and a component housing body 4612.

As shown in FIGS. 6 and 7, the light source housing 4611 is located at an end of the U-shape of the optical component casing 46. The light source housing 4611 is shaped in a container having an opening 4611A on −Y-axis side (lower side). The light source device 41 is adapted to be attached inside the light source housing 4611 through the opening 4611A.

As shown in FIG. 6, openings 4611B are provided on respective sides intersecting X-axis direction (i.e. the sides facing the inner side and outer side of U-shape of the optical component casing 46) of the light source housing 4611 (FIG. 6 only shows the opening provided on the inner side of the U-shape). The openings 4611B allows air-circulation within the light source housing 4611 to cool the light source device 41 provided therein.

The component housing body 4612 is formed in a container-shape having an opening (not shown) on +Y-axis side (upper side). The respective optical systems 42 and 43 are housed into the component housing body 4612 through the opening. In the component housing body 4612, the respective optical systems 42 and 43 are sequentially arranged in the component housing body 4612 from a first end connected with the light source housing 4611 and the optical device 45 is housed on a second end opposite to the first end.

Openings 4612R, 4612G and 4612B (see FIGS. 13 and 14) are provided on −Y-axis side of the component housing body 4612 at positions corresponding to the positions of the liquid crystal panels 451R, 451G and 451B constituting the optical device 45.

Further, an opening 4612P (see FIGS. 13 and 14) is provided on −Y-axis side of the component housing body 4612 at a position corresponding to the position of the polarization converter 423.

The openings 4612R, 4612G, 4612B and 4612P work as an inlet for introducing air into a space Ar1 (FIGS. 8 and 9) in which the optical device 45 is disposed and a space Ar2 (FIGS. 8 and 9) in which the polarization converter 423 is disposed within the optical component casing 46.

As shown in FIG. 8, the lid member 462 is a component that closes +Y-axis opening of the component housing body 4612, which has approximately the same planar shape as the planar shape of the component housing body 4612.

As shown in FIG. 8, the lid member 462 has a C-shaped cutout 4621 at a position corresponding to the location of the optical device 45 in a manner planarly surrounding the optical device 45.

Further, as shown in FIG. 8, an opening 4622 is provided on the lid member 462 at a position corresponding to the polarization converter 423.

The cutout 4621 and the opening 4622 work as outlets for discharging the air introduced into the spaces Ar1 and Ar2 within the optical component casing 46 through the above-mentioned openings 4612R, 4612G, 4612B and 4612P toward the outside of the optical component casing 46.

Incidentally, though not specifically illustrated, the space Ar1 is not in communication with adjacent other spaces by the presence of rib provided on the component housing body 4612, optical components such as the incident-side polarization plate 452 and the field lens 455 and a protrusion 8415 (described below) within the optical component casing 46. Similarly, the space Ar2 is not in communication with adjacent other spaces by the presence of the rib provided on the component housing body 4612, optical components such as the second lens array 422 and the condenser lens 425 within the optical component casing 46.

Arrangement of Power Source Unit

The power source unit 5 supplies electric power to the respective components of the device body of the projector 1. As shown in FIG. 8, the power source unit 5 stretches from the rear side to the front side along −X-axis side of the exterior casing 2. Though not specifically illustrated, the power source unit 5 includes a power source block for supplying electric power fed from the outside through a power cable to the respective components and a lamp-drive block for lighting the light source lamp 411 based on the electric power supplied from the power source block. As shown in FIGS. 3 to 8, the power source block and the lamp drive block are covered with a shield member 51 made of metal such as aluminum, the shield member 51 having openings on both ends. The shield member 51 guides the air introduced from the rear side toward the front side and prevents leakage of electromagnetic noise generated by the power source block and the lamp drive block toward the outside.

Arrangement of Sealed Circulation Air-Cooling Unit

Figure 10:
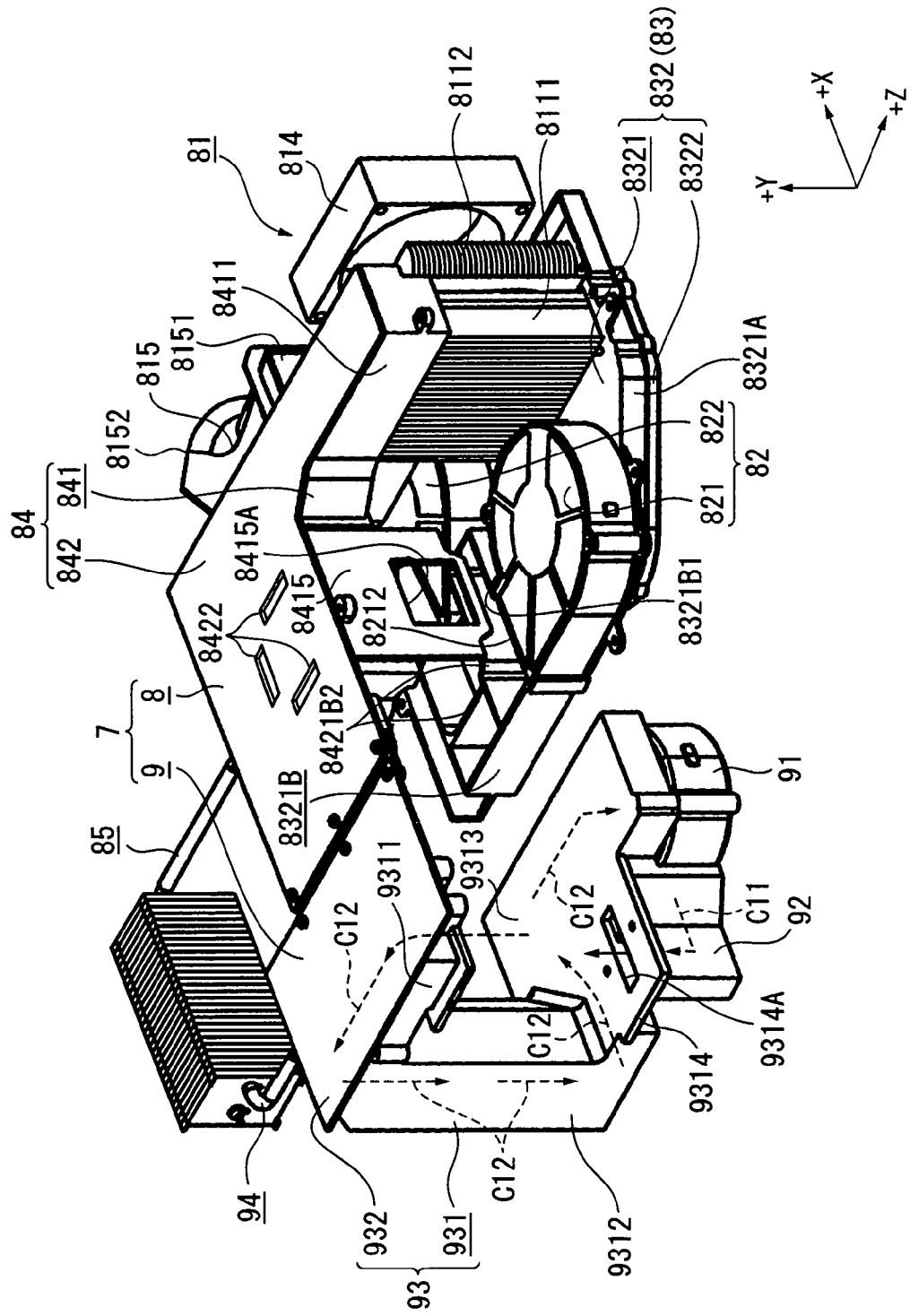
FIG. 10 is an illustration showing an arrangement of a sealed circulation air-cooling unit of the aforesaid embodiment.
Figure 11:
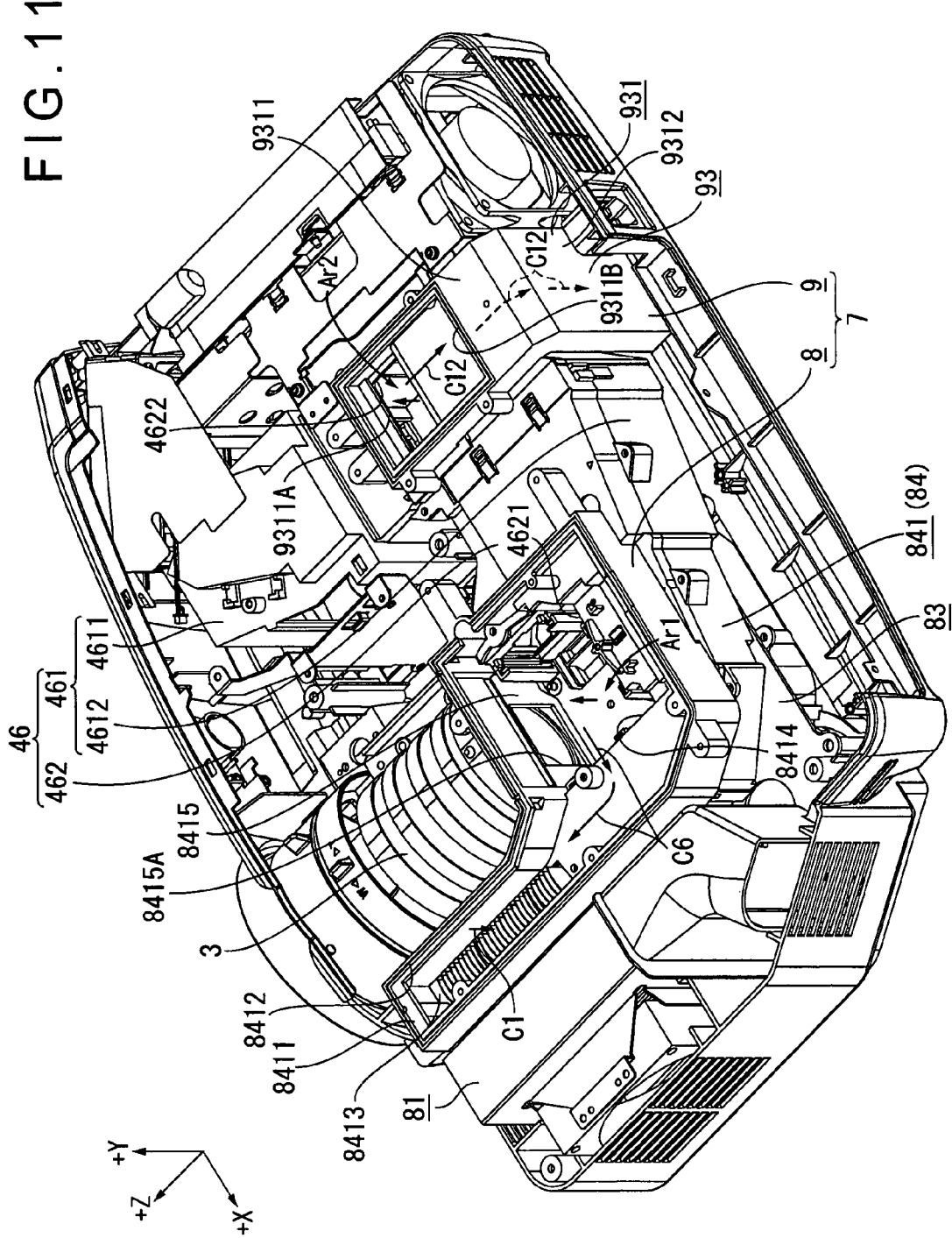
FIG. 11 is another illustration showing the arrangement of the sealed circulation air-cooling unit of the aforesaid embodiment.
Figure 12:
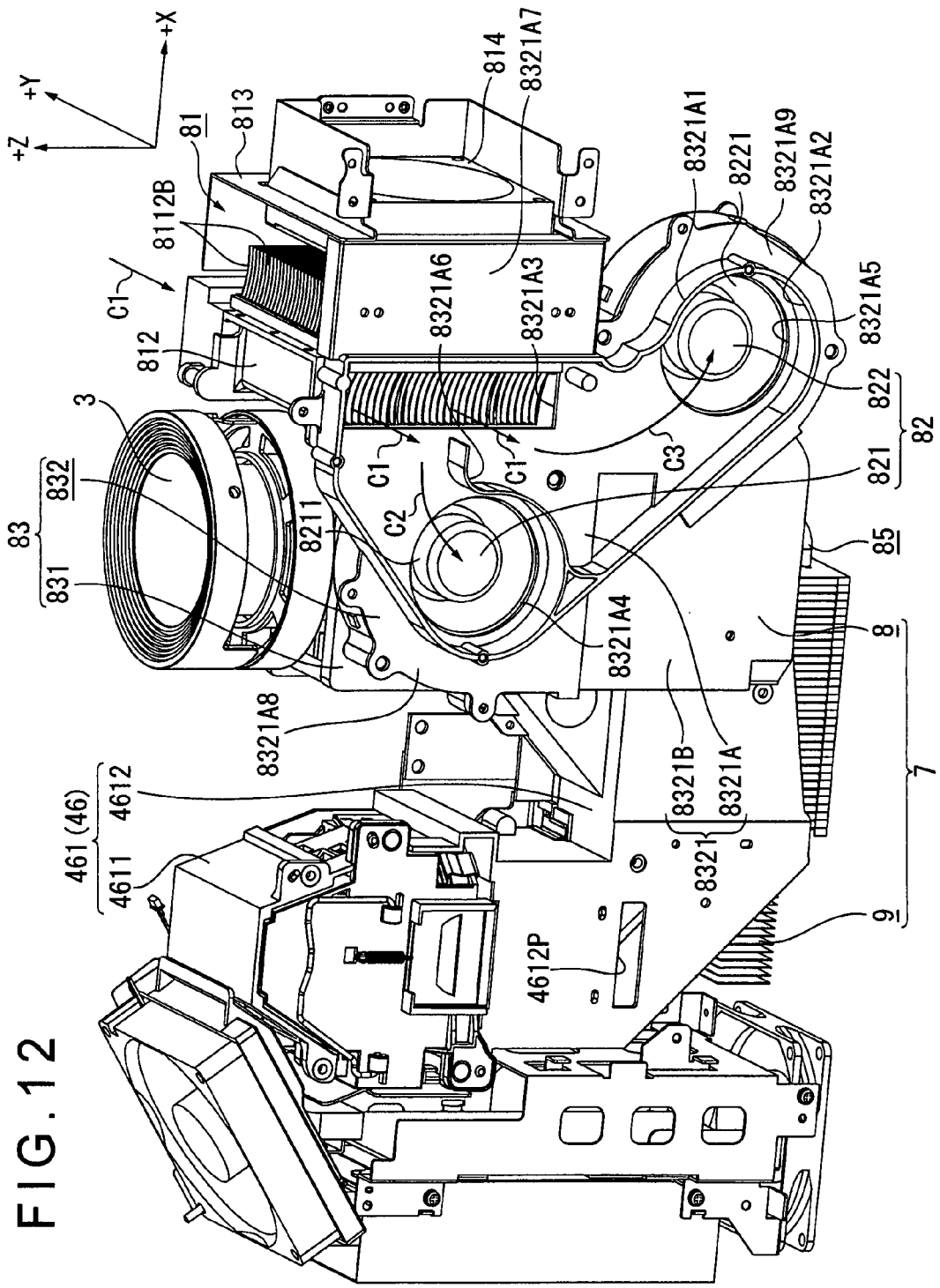
FIG. 12 is still another illustration showing the arrangement of the sealed circulation air-cooling unit of the aforesaid embodiment.
Figure 13:
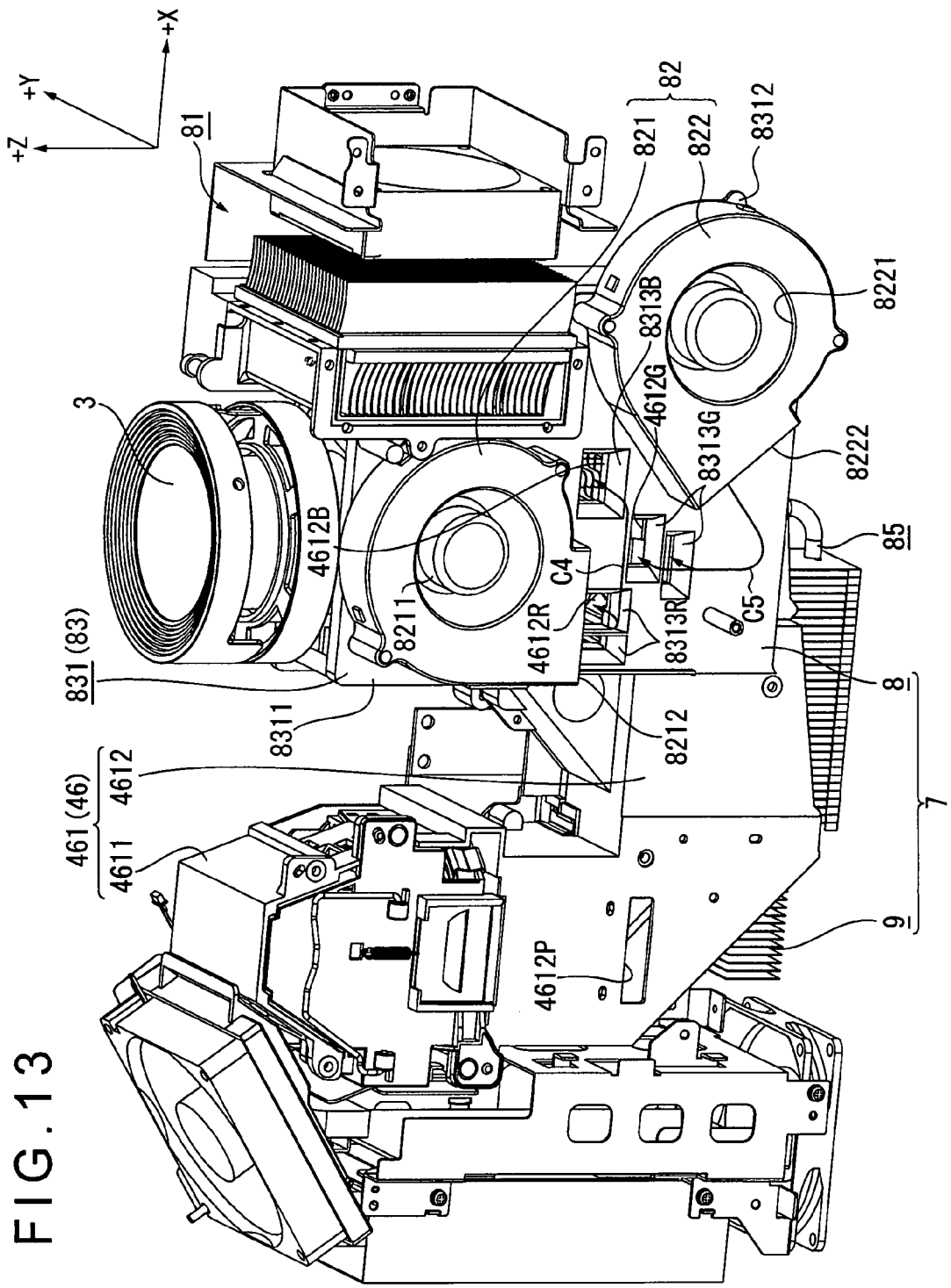
FIG. 13 is a further illustration showing the arrangement of the sealed circulation air-cooling unit of the aforesaid embodiment.
Figure 14:
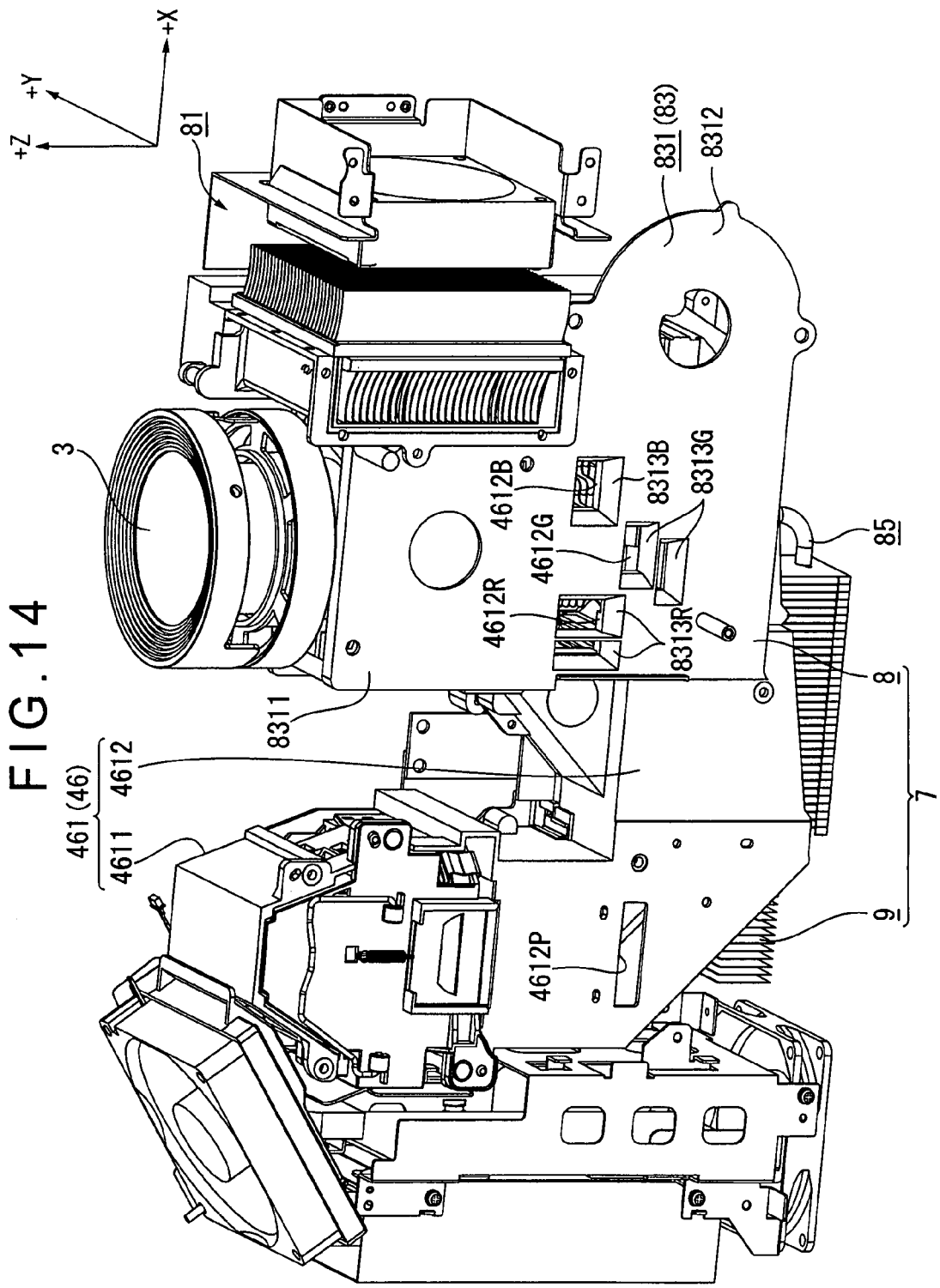
FIG. 14 is still further illustration showing the arrangement of the sealed circulation air-cooling unit of the aforesaid embodiment.

FIGS. 10 and 14 are illustrations each showing the arrangement of the sealed circulation air-cooling unit 7. Specifically, FIG. 10 is a perspective view showing the upper front side of substantially the entire arrangement of the sealed circulation air-cooling unit 7. FIG. 11 is an illustration showing a state where a part of the sealed circulation air-cooling unit 7 (heat radiators 85 and 94, highly heat-conductive ducts 842 and 932 and the like) is removed from those shown in FIG. 5. FIG. 12 is an illustration showing a state where a part of the intra-casing cooling device 10 (a light-source cooling fan 101 and the like) and a part of the sealed circulation air-cooling unit 7 (a cover member 8322, a circulation fan 91, an auxiliary duct 92, second flow-path downstream duct 93 and the like) are removed from those shown in FIG. 6. FIG. 13 is an illustration showing a state where a part of the sealed circulation air-cooling unit 7 (a duct body 832 and the like) is removed from those shown in FIG. 12. FIG. 14 is an illustration showing a state where a part of the sealed circulation air-cooling unit 7 (a circulation fan 82 and the like) is removed from those shown in FIG. 13.

The sealed circulation air-cooling unit 7 as well as the optical component casing 46 defines a sealed structure according to the invention. The sealed circulation air-cooling unit 7 circulates the air within a loop first air-circulation path including the space Ar1 of the optical component casing 46 to cool the optical device 45 disposed within the space Ar1. The sealed circulation air-cooling unit 7 also circulates the air within a loop second air-circulation path including the space Ar2 of the optical component casing 46 to cool the polarization converter 423 disposed within the space Ar2.

As shown in FIGS. 10 to 14, the sealed circulation air-cooling unit 7 includes: a first air-cooling unit 8 that constitutes a first sealed structure together with the optical component casing 46 and circulates the air of the first air-circulation path within the first sealed structure to cool the optical device 45; and a second air-cooling unit 9 that constitutes a second sealed structure together with the optical component casing 46 and circulates the air of the second air-circulation path within the second sealed structure to cool the polarization converter 423.

Arrangement of First Air-Cooling Unit

As shown in FIGS. 6, 7, 10 and 14, the first air-cooling unit 8 includes a heat exchanger 81, the circulation fan 82 (FIGS. 6, 7, 10, 12 and 13), a flow-path upstream duct 83, the first flow-path downstream duct 84 (FIGS. 4, 5, 10 and 11) and the first heat radiator 85 (FIGS. 6, 7, 10, 12 to 14).

Incidentally, the arrangement will be sequentially described below from upstream side of the space Ar1 along the first air-circulation path. Specific arrangement of the circulation fan 82 will be described together with the flow-path upstream duct 83.

Arrangement of Heat Exchanger

Figure 15:
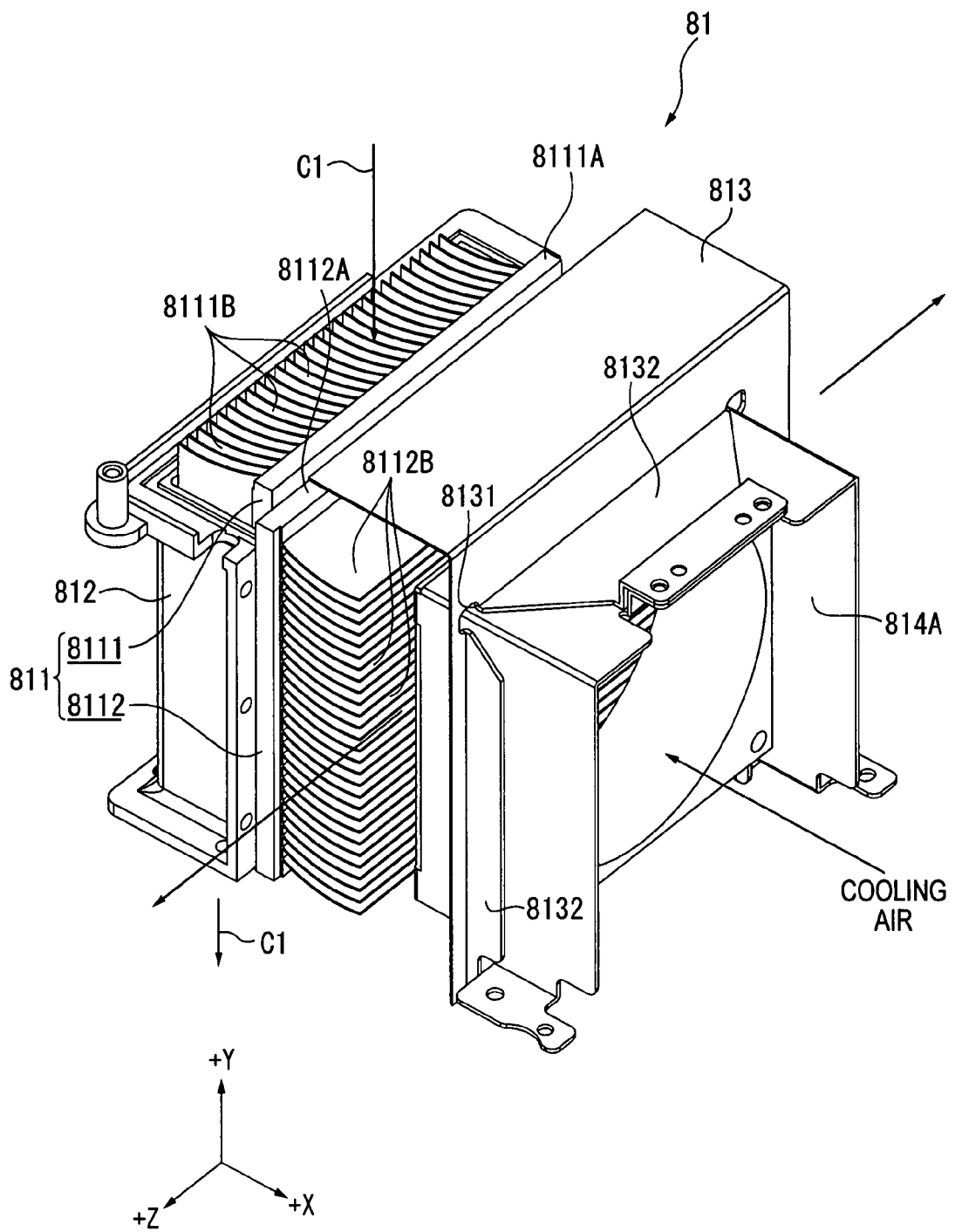
FIG. 15 is a perspective view showing an arrangement of a heat exchanger according to the aforesaid embodiment.
Figure 16:
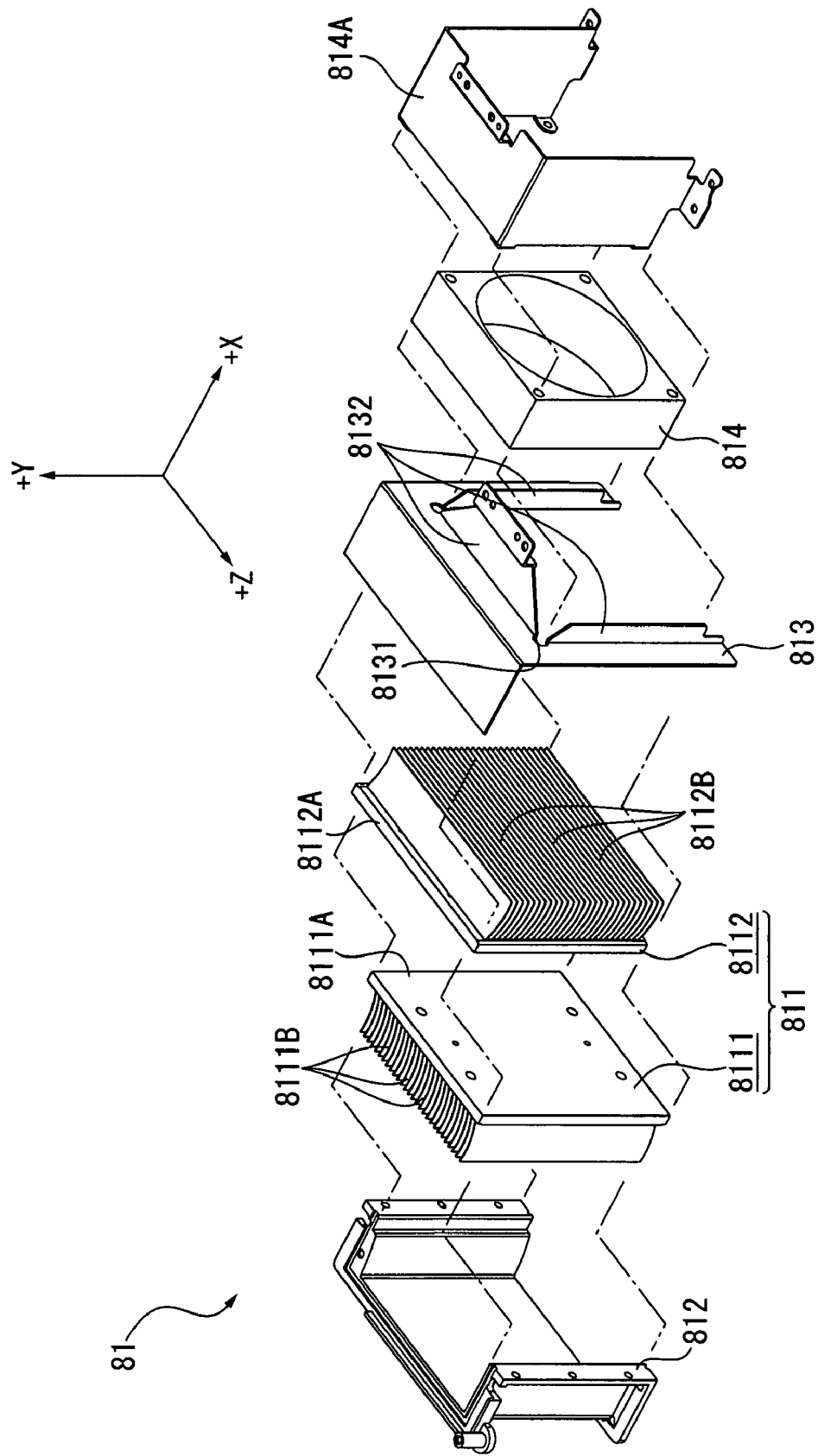
FIG. 16 is another perspective view showing the arrangement of the heat exchanger according to the aforesaid embodiment.

FIGS. 15 and 16 are perspective views showing the arrangement of the heat exchanger 81. Specifically, FIG. 15 is a perspective view of the heat exchanger 81 when seen in +Z-axis direction. FIG. 16 is an exploded perspective view of FIG. 15. Incidentally, a heat-exchanger exhaust duct 815 is not shown in FIGS. 15 and 16 for the convenience of explanation.

As shown in FIGS. 11 to 14, the heat exchanger 81 is disposed at +X-axis side of the projection lens 3. The heat exchanger 81 receives the heat of the air flowing through the first air-circulation path within the first sealed structure and radiates the heat toward the outside of the first sealed structure. As shown in FIGS. 15 and 16, the heat exchanger 81 has a heat exchanger body 811, a heat-receiving-side duct 812, a heat-radiating-side duct 813, a cooling fan 814 and a heat-exchanger exhaust duct 815 (FIGS. 3 to 5, FIG. 8 and FIG. 10).

As shown in FIGS. 15 and 16, the heat exchanger body 811 includes a heat-receiving-side heat-conductive member 8111 and a heat-radiating-side heat-conductive member 8112.

The heat-receiving-side heat-conductive member 8111 is formed of a highly heat-conductive material (see the Table 1 below), which is coupled with the heat-radiating-side heat-conductive member 8112 in a heat-transferable manner. As shown in FIGS. 15 and 16, the heat-receiving-side heat-conductive member 8111 is a so-called heat sink, which includes a rectangular plate body 8111A and a plurality of plate-shaped fin members 8111B projecting from −X axis side of the plate body 8111A (i.e. a side opposite to the side to be coupled with the heat-radiating-side heat-conductive member 8112) and extending in Y-axis direction (up and down direction).

The heat-radiating-side heat-conductive member 8112 is formed of a highly heat-conductive material (see the Table 1 below) as in the heat-receiving-side heat-conductive member 8111. The heat-radiating-side heat-conductive member 8112 is a heat-sink including a plate body 8112A and a plurality of fin members 8112B as shown in FIGS. 15 and 16. The plurality of fin members 8112B extend, as shown in FIGS. 15 and 16, in a direction (Z-axis direction) substantially orthogonal to the extending direction of the plurality of fin members 8111B of the heat-receiving-side heat-conductive member 8111.

The heat-receiving duct 812 is made of low heat-conductive material (see the Table 1 below), which exhibits approximately C-shaped cross section surrounding the plurality of fin members 8111B of the heat-receiving-side heat-conductive member 8111 and extending in Y-axis direction as shown in FIGS. 15 and 16. The heat-receiving-side duct 812 is adapted to be connected with the plate body 8111A of the heat-receiving-side heat-conductive member 8111 at a tip end of the C-shape. When the heat-receiving-side duct 812 is connected with the plate body 8111A, the plurality of fin members 8111B are accommodated within the interior of the C-shape. As shown in FIG. 15, the heat-receiving-side duct 812 provides a flow-path C1 that allows air-circulation along the extending direction of the plurality of fin members 8111B. The flow-path C1 defines a part of the first air-circulation path within the first sealed structure. Specifically, the heat-receiving-side heat-conductive member 8111 faces the inside of the first sealed structure and the heat-radiating-side heat-conductive member 8112 faces the outside of the first sealed structure. The heat of the air flowing through the flow-path C1 is transferred to the heat-radiating-side heat-conductive member 8112 via a heat-transfer-path from the plurality of fin members 8111B to the plate body 8111A, the plate body 8112A and the plurality of fin members 8112B.

The heat-radiating-side duct 813 is made of a highly heat-conductive material (see the Table 1 below). As shown in FIGS. 15 and 16, the heat-radiating-side duct 813 is disposed at +X-axis side of the heat-radiating-side heat-conductive member 8112, which guides the air delivered by the cooling fan 814 through the heat-radiating-side heat-conductive member 8112 in a predetermined direction. More specifically, as shown in FIGS. 15 and 16, the heat-radiating-side duct 813 exhibits a substantially L-shaped cross section enclosing +X-axis side and +Y-axis side of the heat-radiating-side heat-conductive member 8112. The heat-radiating duct 813 has a cutout 8131 on +X-axis side thereof (i.e. the side facing the fin members 8112B) as shown in FIGS. 15 and 16. Around the periphery of the cutout 8131, a connecting section 8132 to be connected with a fan attachment 814A for mounting the cooling fan 814 to the inside of the exterior casing 2 is provided as shown in FIGS. 15 and 16. As shown in FIG. 15, the heat-radiating-side duct 813 guides the air blown by the cooling fan 814 to the fin members 8112B in two directions of +Z-axis direction and −Z-axis direction.

The cooling fan 814 is an axial flow fan as shown in FIGS. 15 and 16, which opposes to the heat-exchanger air inlets 213 and 214 provided on the exterior casing 2. When being driven under the control of the control board 6, the cooling fan 814 inhales the air outside the exterior casing 2 and discharges the air toward the plurality of fin members 8112B of the heat-radiating-side heat-conductive member 8112. Specifically, the heat transferred to the plurality of fin members 8112B through the heat-transfer path from the plurality of fin members 8111B to the plate body 8111A, the plate body 8112A and the plurality of fin members 8112B is cooled by the cooling fan 814.

The heat-exchanger exhaust duct 815 guides the air delivered by the cooling fan 814 to the heat-radiating-side heat-conductive member 8112 and guided in −Z-axis direction by the heat-radiating-side duct 813, toward the second heat-exchanger exhaust holes 215 and 226 provided on the exterior casing 2. As shown in FIGS. 3 to 5, FIG. 8 and FIG. 10, the heat-exchanger exhaust duct 815 extends in −Z-axis direction from an introduction hole 8151 for introducing the air into the inside and an exhaust hole 8152 for discharging the inside air to the outside. The tip end of the duct 815 in extending direction is bent by a predetermined angle in +X-axis direction. As shown in FIG. 5, the introduction hole 8151 of the heat-exchanger exhaust duct 815 is connected to −Z-axis-direction end of the heat-radiating-side duct 813. The exhaust hole 8152 opposes to the two heat-exchanger exhaust holes 215 and 226 provided on the exterior casing 2.

Accordingly, among the air delivered to the heat-radiating-side heat-conductive member 8112 from the cooling fan 814, the air introduced to −Z-axis side by the heat-radiating-side duct 813 is guided to the second heat-exchanger exhaust holes 215 and 226 via the heat-exchanger exhaust duct 815, which is discharged to the outside of the exterior casing 2 through the second heat-exchanger exhaust holes 215 and 226, as shown in FIG. 5.

Among the air delivered to the heat-radiating-side heat-conductive member 8112 from the cooling fan 814, the air introduced to +Z-axis side by the heat-radiating-side duct 813 is discharged to the outside of the exterior casing 2 through the first heat-exchanger exhaust holes 214 and 225 provided on the exterior casing 2, as shown in FIG. 5.

Arrangement of Flow-Path Upstream Duct

The flow-path upstream duct 83 is formed of a low heat-conductive material (see the Table 1 below). The flow-path upstream duct 83 guides the air introduced through the flow-path C1 and the heat exchanger 81 toward the circulation fan 82 and guides the air discharged by the circulation fan 82 to the space Ar1. As shown in FIGS. 6, 7, 10 and 12 to 14, the flow-path upstream duct has a base plate 831 (FIGS. 6, 7 and 12 to 14) and a duct body 832 (FIGS. 6, 7, 10 and 12).

As shown in FIGS. 6, 7 and 12 to 14, the base plate 831 is attached to and spaced away at a predetermined gap (e.g. 5 to 10 mm) from −Y-axis side of the component housing body 4612 of the optical component casing 46 to support the circulation fan 82 and the duct body 832. The base plate 831 has an approximately L-shape (in plan view) as shown in FIGS. 13 and 14. More specifically, the base plate 831 extends in −Z-axis direction from the lower side of the projection lens 3 to the mount position of the optical device 45 within the optical component casing 46 with −Z-axis end thereof extending in +X-axis direction.

The portion of the base plate 831 located below the projection lens 3 works as a first attachment 8311 for attaching the circulation fan 82. The portion of the base plate 831 extending in +X-axis direction from the position corresponding to the mount position of the optical device 45 works as a second attachment 8312 for attaching the circulation fan 82.

The circulation fan 82 circulates the air along the loop first air-circulation path within the first sealed structure. As shown in FIG. 13, the circulation fan 82 includes a first sirocco fan 821 and a second sirocco fan 822. As shown in FIG. 13, the first sirocco fan 821 is attached to the first attachment 8311 of the base plate 831 so that an air intake 8211 thereof is directed in −Y-axis direction and a discharge outlet 8212 thereof is directed in −Z-axis direction. Further, as shown in FIG. 13, the second sirocco fan 822 is attached to the second attachment 8312 of the base plate 831 so that an air intake 8221 thereof is directed in −Y-axis direction and a discharge outlet 8222 thereof is directed in −Z-axis direction and is inclined toward −X-axis side by a predetermined angle relative to XY plane.

Openings 8313R, 8313G and 8313B respectively corresponding to the openings 4612R, 4612G and 4612B provided on the optical component casing 46 are provided on the base plate 831 at a position corresponding to the mount position of the optical device 45, as shown in FIGS. 13 and 14.

When the duct body 832 is attached on −Y-axis side of the base plate 831, the duct body 832 guides the air introduced through the flow-path C1 and the heat exchanger 81 toward the circulation fan 82 and guides the air discharged by the circulation fan 82 toward the space Ar1. As shown in FIGS. 6, 7, 10 and 12, the duct body 832 includes a base 8321 and a cover member 8322 (FIGS. 6, 7 and 10).

As shown in FIG. 12, the base 8321 has an approximately the same plan shape as the plan shape of the base plate 831, which includes an integrated arrangement of a first duct 8321A and a second duct 8321B.

The first duct 8321A guides the air introduced through the flow path C1 via the heat exchanger 81 toward the circulation fan 82. As shown in FIG. 12, the first duct 8321A has a partition 8321A1 that planarly surrounds the heat-receiving-side duct 812 and the circulation fan 82 when the sealed circulation air-cooling unit 7 is mounted on the optical component casing 46. The first duct 8321A defines a container with an opening 8321A2 being provided on −Y-axis side thereof.

An opening 8321A3 that is in communication with the flow-path C1 is provided on the first duct 8321A at a position corresponding to the heat-receiving-side duct 812 of the heat exchanger 81 as shown in FIG. 12.

Openings 8321A4, 8321A5 are respectively provided in the first duct 8321A at locations corresponding to the air intakes 8211 and 8221 of the sirocco fans 821 and 822 of the circulation fan 82 as shown in FIG. 12.

A rectifying rib 8321A6 extending from the partition 8321A1 to the opening 8321A3 is provided between the openings 8321A4 and 8321A5 of the first duct 8321A as shown in FIG. 12.

Further, a rectangular (in plan view) heat-radiating flow restricting portion 82A7 extending in +X-axis direction from the partition 8321A1 is provided on the first duct 8321A at a position corresponding to the heat-radiating-side duct 813 of the heat exchanger 81 as shown in FIG. 12. In other words, when the first air-cooling unit 8 is assembled, the heat-radiating flow restricting portion 8321A7 and the heat-radiating-side duct 813 are connected. The heat-radiating flow restricting portion 8321A7 and the heat-radiating-side duct 813 guide the air blown from the cooling fan 814 to the plurality of fin members 8112B in +Z-axis direction and −Z-axis direction.

The periphery of the opening 8321A4 of the first duct 8321A works as a first attachment 8321A8 for attaching the first sirocco fan 821 of the circulation fan 82 as shown in FIG. 12. In other words, the first sirocco fan 821 is held and rigidly secured by the first attachment 8311 of the base plate 831 and the first attachment 8321A8 of the duct body 832.

The periphery of the opening 8321A5 of the first duct 8321A works as a second attachment 8321A9 for attaching the first sirocco fan 821 of the circulation fan 82 as shown in FIG. 12. In other words, the second sirocco fan 822 is held and rigidly secured by the second attachment 8312 of the base plate 831 and the second attachment 8321A9 of the duct body 832.

As shown in FIGS. 6 and 7, the cover member 8322 is attached to the partition 8321A1 of the first duct 8321A and closes the opening 8321A2.

When the cover member 8322 is attached to the first duct 8321A, the air flowing through the flow-path C1 is introduced between the first duct 8321A and the cover member 8322 through the opening 8321A3. At this time, a flow-path C2 for guiding the air to the opening 8321A4 (the first sirocco fan 821) and a flow-path C3 for guiding the air to the opening 8321A5 (the second sirocco fan 822) are defined by the rectifying rib 8321A6. The flow-paths C2 and C3 define a part of the first air-circulation path within the first sealed structure.

The second duct 8321B guides the air inhaled and discharged by the sirocco fans 821 and 822 through the flow-paths C2 and C3 into the space Ar1 within the optical component casing 46. As shown in FIG. 10, the second duct 8321B exhibits a container-shape having an opening on +Y-axis direction thereof.

A cutout 8321B1 to be connected with the discharge outlet 8212 of the first sirocco fan 821 and a cutout (not shown) to be connected with the discharge outlet 8222 of the second sirocco fan 822 are provided on a sidewall of the container of the second duct 8321B as shown in FIG. 10.

Further, as shown in FIG. 10, the second duct 8321B is provided with a rectifying rib 8321B2 that guides the air discharged from the first sirocco fan 821 and the second sirocco fan 822 to a predetermined position. Incidentally, the base plate 831 is not illustrated in FIG. 10 for the convenience of explanation.

When the duct body 832 is attached to the base plate 831, the air flowing through the flow-path C2 and inhaled and discharged by the first sirocco fan 821 is introduced between the second duct 8321B and the base plate 831. At this time, the rectifying rib 8321B2 defines a flow-path C4 that guides the air into the space Ar1 through the openings 8313R, 8313B and the respective openings 4612R and 4612B of the optical component casing 46. As shown in FIG. 13, the air flowing through the flow-path C3 and inhaled and discharged by the second sirocco fan 822 is introduced between the second duct 8321B and the base plate 831. At this time, the rectifying rib 8321B2 defines a flow-path C5 that guides the air into the space Ar1 through the opening 8313G of the base plate 831 and the opening 4612G of the optical component casing 46. The flow-paths C4 and C5 define a part of the first air-circulation path within the first sealed structure.

Arrangement of First Flow-Path Downstream Duct

Figure 17:
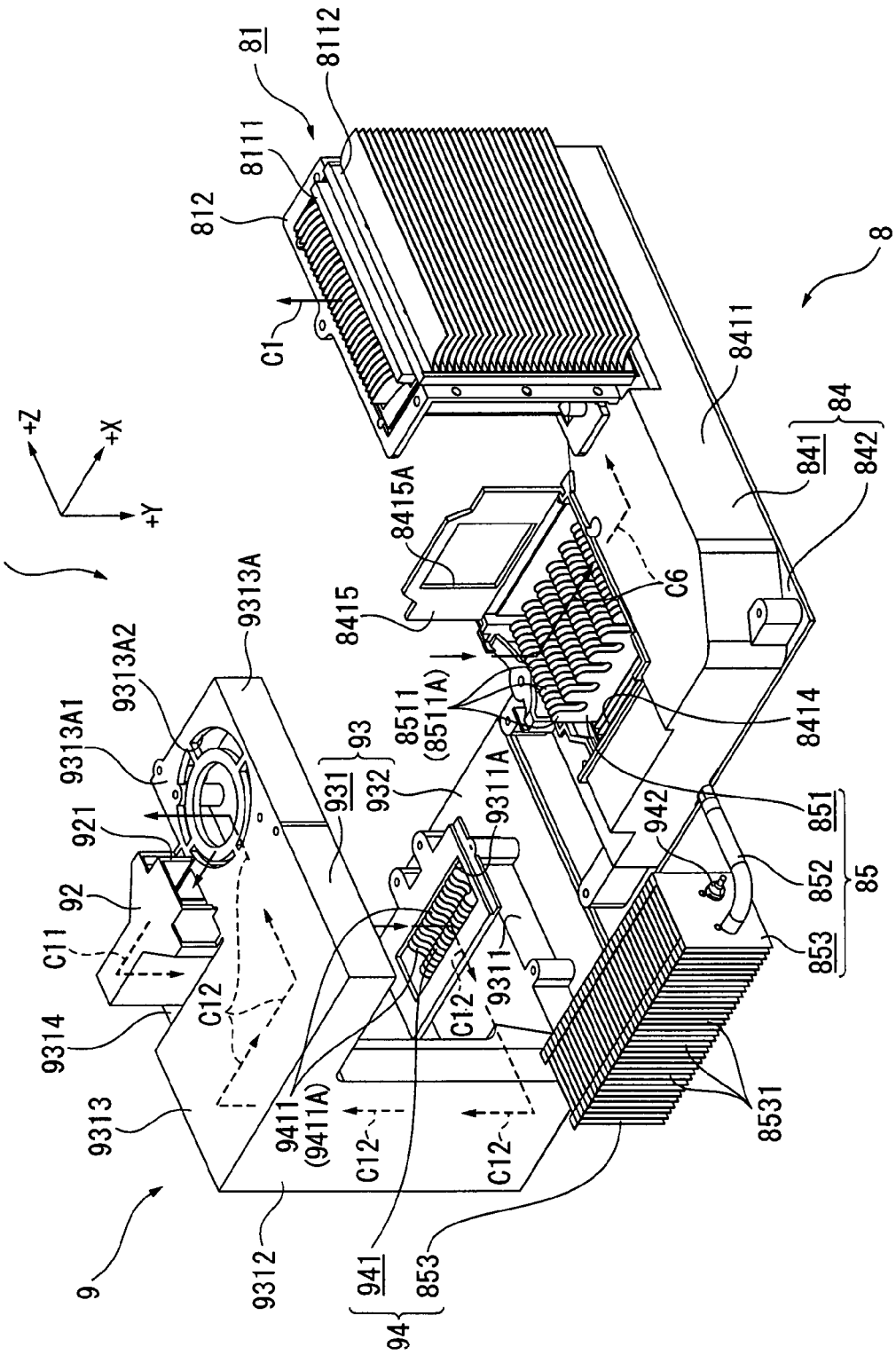
FIG. 17 is an illustration showing an arrangement of a first flow-path downstream duct of the aforesaid embodiment.
Figure 18:
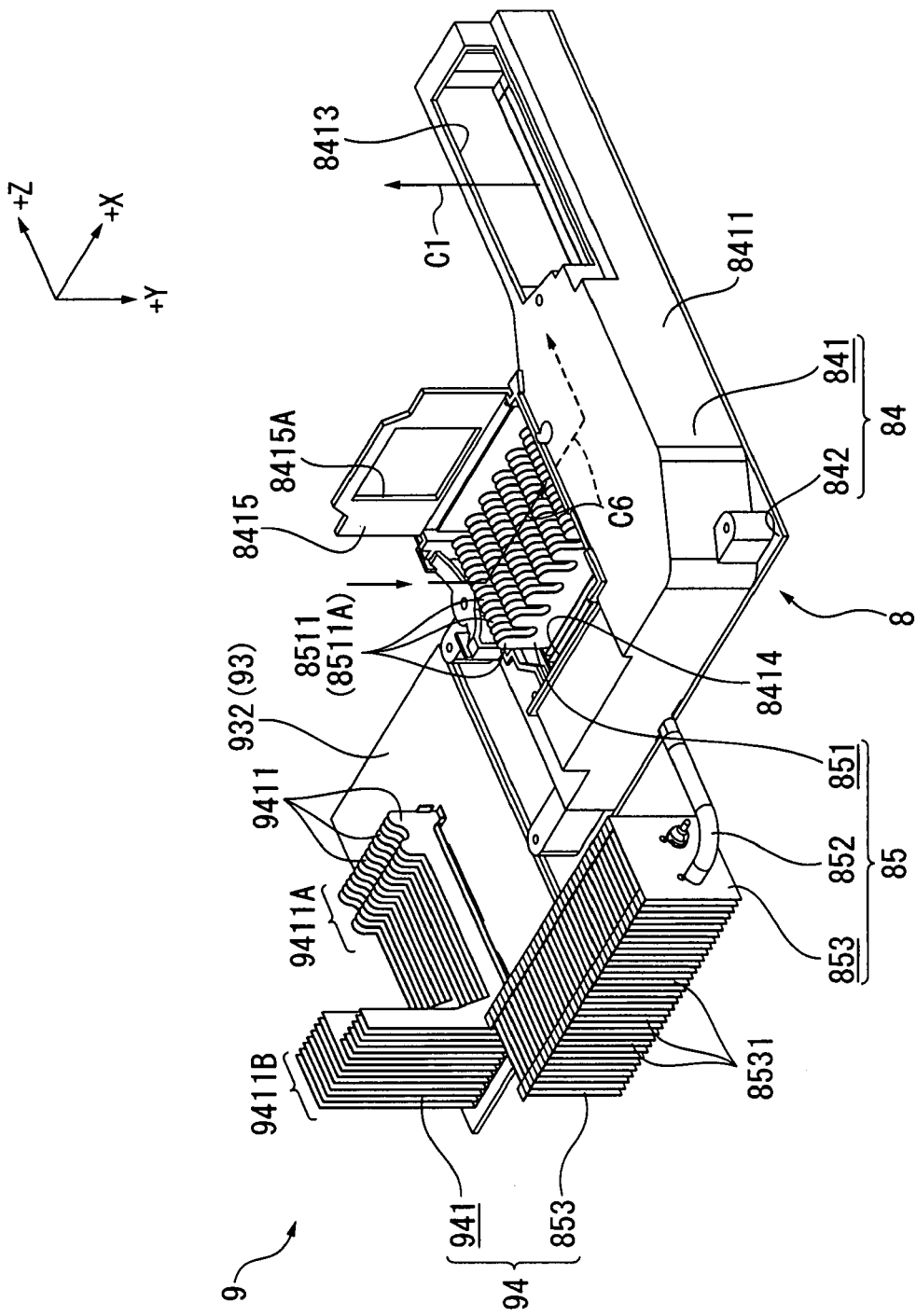
FIG. 18 is another illustration showing the arrangement of the first flow-path downstream duct of the aforesaid embodiment.

FIGS. 17 and 18 are illustrations showing the arrangement of the first flow-path downstream duct 84. Specifically, FIG. 17 is an illustration showing rear side of what is shown in FIG. 10 with a part of the first air-cooling unit 8 (i.e. the circulation fan 82, the flow-path upstream duct 83 and the like) being removed. FIG. 18 is an illustration showing a state where the heat exchanger 81 and a part of the second air-cooling unit 9 (the auxiliary duct 92, the low heat-conductive duct 931 and the like) are removed from FIG. 17.

The first flow-path downstream duct 84 is a component that guides the air flowing from the inside of the space Ar1 to the outside of the space Ar1 toward the heat-receiving-side duct 812 (the flow-path C1) of the heat exchanger 81. As shown in FIGS. 4, 5, 10, 11, 17 and 18, the first flow-path downstream duct 84 includes a low heat-conductive duct 841 and a high heat-conductive duct 842 (FIGS. 4, 5, 10, 17 and 18).

The low heat-conductive duct 841 is made of a low heat-conductive material (see the Table 1 below). As shown in FIG. 11, the low heat-conductive duct 841 includes a partition 8411 that planarly surrounds +Y-axis side opening of the heat-receiving-side duct 812 of the heat exchanger 81 and the mount position of the optical device 45 inside the optical component casing 46, which defines a substantially L-shaped (in plan view) container having an opening 8412 on +Y-axis side thereof. The low heat-conductive duct 841 is, though not specifically illustrated, attached on +Y-axis side of the lid member 462 at a predetermined intervals (e.g. 5 to 10 mm).

As shown in FIGS. 11 and 18, the opening 8413 in communication with the flow-path C1 is provided on the low heat-conductive duct 841 at a position corresponding to the heat-receiving-side duct 812.

An opening 8414 in communication with the space Ar1 through the cutout 4621 is provided on the low heat-conductive duct 841 at a position corresponding to the cutout 4621 of the lid member 462 as shown in FIGS. 11, 17 and 18.

As shown in FIGS. 10, 11, 17 and 18, a rectangular (in plan view) projection 8415 projecting in −Y-axis direction is provided on the periphery of +Z-axis side of the opening 8414 of the low heat-conductive duct 841. The projection 8415 is provided with a rectangular (in plan view) opening 8415 as shown in FIGS. 10, 11, 17 and 18. When the first flow-path downstream duct 84 is mounted on the optical component casing 46, the projection 8415 is disposed between the optical device 45 mounted within the optical component casing 46 and the projection lens 3 through the cutout 4621 of the lid member 462. The color image formed by the optical device 45 enters the projection lens 3 through the opening 8415A of the projection 8415. In other words, the projection 8415 is a component that closes the opening on the optical component casing 46 provided at the mount position of the projection lens 3.

The high heat-conductive duct 842 is made of high heat-conductive material (see the Table 1 below), which is a plate member attached to the partition 8411 of the low heat-conductive duct 841 to close the opening 8412 as shown in FIGS. 4, 5, 10, 17 and 18.

Figure 19:
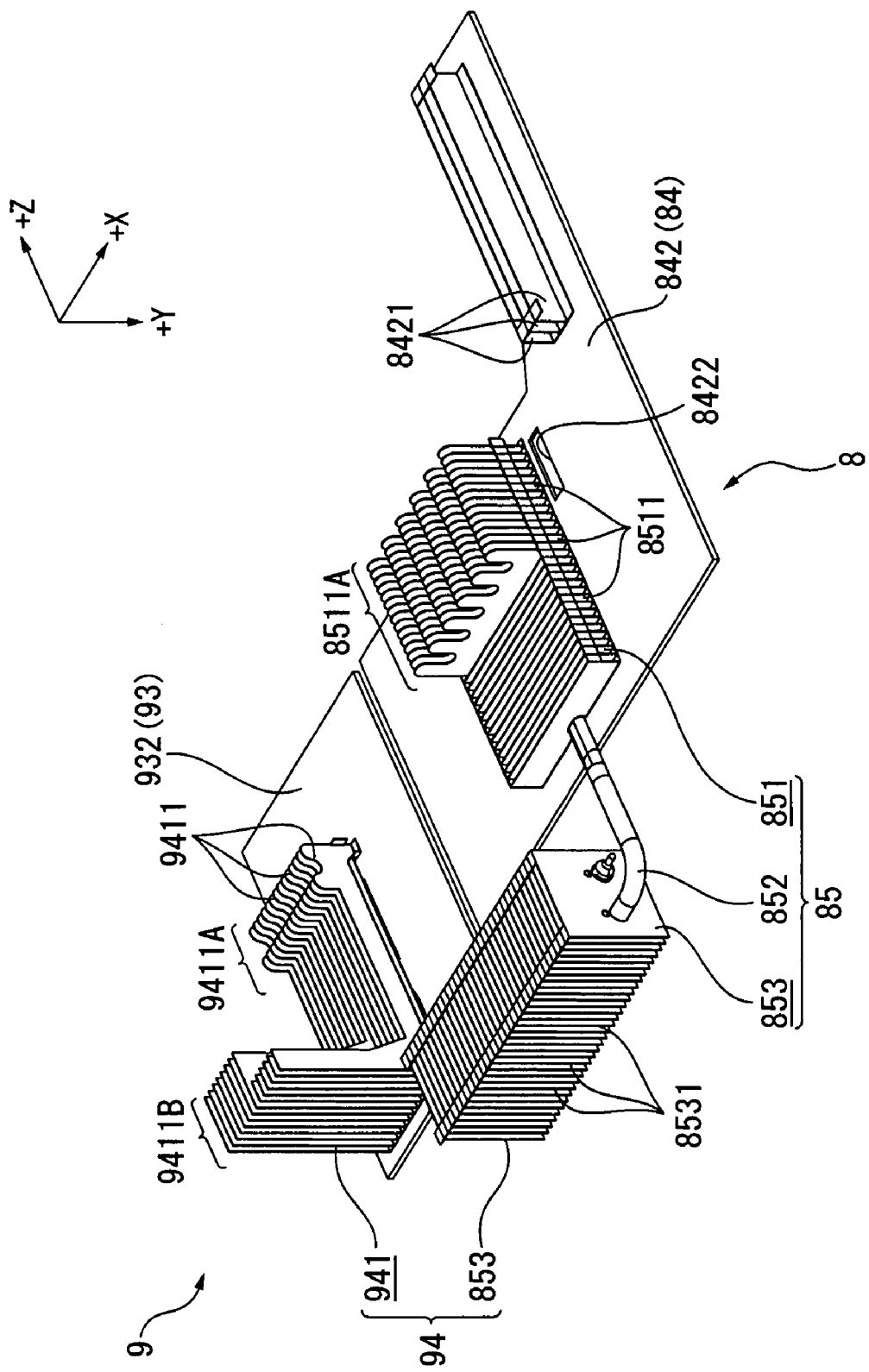
FIG. 19 is an illustration showing an arrangement of a first heat radiator of the aforesaid embodiment.
Figure 20:
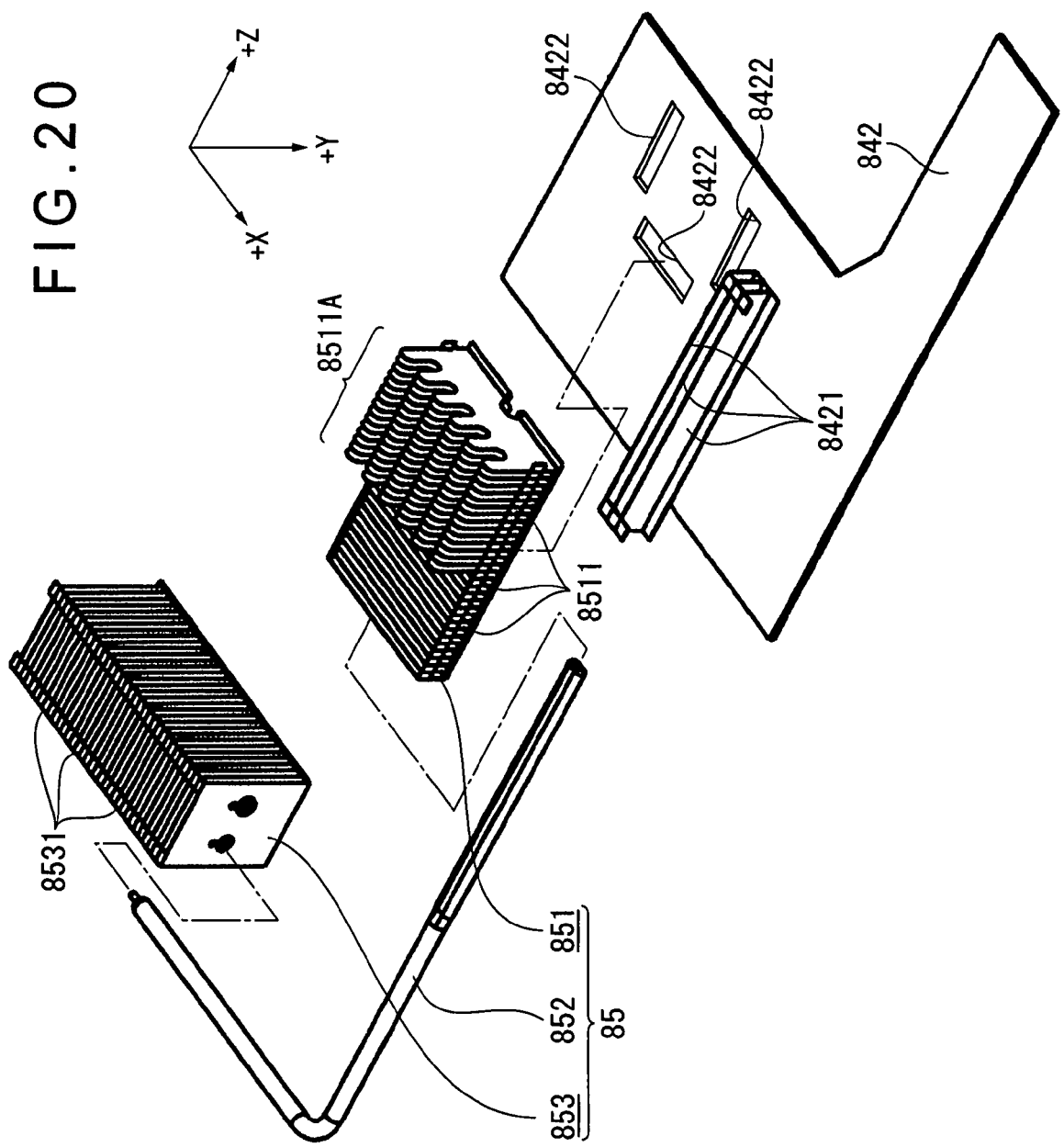
FIG. 20 is another illustration showing the arrangement of the first heat radiator of the aforesaid embodiment.

A plurality of plate-shaped fin members 8421 are attached on the inner side (−Y-axis side) of the high heat-conductive duct 842 at a position corresponding to the opening 8413 of the low heat-conductive duct 841 (see FIGS. 19 and 20). The plurality of fin members 8421 are made of high heat-conductive material (see the Table 1 below), which are mutually stacked in parallel and are connected with the high heat-conductive duct 842 in a heat-transferable manner. When the high heat-conductive duct 842 is attached to the low heat-conductive duct 841, the plurality of fin members 8421 projects to the proximity of the heat-receiving-side heat-conductive member 8111 within the heat-receiving-side duct 812 through the opening 8413 of the low heat-conductive duct 841.

The thickness of the respective fin members 8421 is set at 0.3 mm or more and 2.0 mm or less. The interval between the fin members 8511 is set at 2.0 mm or more and 10.0 mm or less.

Further, as shown in FIGS. 4, 5 and 10, holes 8422 for inserting FPC cables 456 that connects the respective liquid crystal panels 451 and the control board 6 are provided on the high heat-conductive duct 842. The gap between the respective holes 8422 and the FPC cables 456 are sealed by rubber, sponge and the like so as not to impair the closeness inside the first flow-path downstream duct 84.

When the high heat-conductive duct 842 is attached to the low heat-conductive duct 841, the air flowing from the inside of the space Ar1 toward the outside of the space Ar1 is introduced into the inside of the first flow-path downstream duct 84 through the cutout 4621 and the opening 8414 as shown in FIGS. 11, 17 and 18, thereby defining a flow-path C6 that guides the air to the heat-receiving-side duct 812 (the flow-path C1) through the opening 8413. The flow-path C6 defines a part of the first air-circulation path within the first sealed structure.

In other words, the loop first air-circulation path within the first sealed structure is defined by the above-described flow-paths C1-C6 and the space Ar1. The circulation fan 82 circulates the air through the loop first air-circulation path (i.e. from the flow-path C1 to the flow-paths C2, C3, the flow-paths C4, C5, the space Ar1, the flow-path C6 and back to the flow-path C1), which cools the optical device 45 (the liquid crystal panel 451, the incident-side polarization plate 452, the irradiation-side polarization plate 454 and the like) within the space Ar1.

Incidentally, though not specifically illustrated, the optical component casing 46 and the first air-cooling unit 8 provides a sealed structure where the first air-circulation path is not in communication with the outside with an elastic seal member and the like being interposed therebetween.

Arrangement of First Heat Radiator

FIGS. 19 and 20 are illustrations showing the arrangement of the first heat radiator 85. Specifically, FIG. 19 is an illustration in which the low heat-conductive duct 841 is removed from the state shown in FIG. 18. FIG. 20 is an exploded perspective view showing the lower side of the first heat radiator 85.

As shown in FIGS. 17 to 20, the first heat radiator 85 is a device that is connected with the high heat-conductive duct 842 of the first flow-path downstream duct 84. The first heat radiator 85 receives the heat of the air flowing through the first air-circulation path within the first sealed structure (the flow-path C6) and radiates the heat to the outside of the first sealed structure. As shown in FIGS. 17 to 20, the first heat radiator 85 includes a first heat-receiving member 851, a first heat-conducting member 852, a first heat-radiating member 853 and a cooling fan 854 (FIGS. 5-7).

The first heat-receiving member 851 is made of a highly heat-conductive material (see the Table 1 below), which is connected to the inner side (−Y-axis side) of the high heat-conductive duct 842 in a heat-transferable manner to receive the heat of the air flowing through the flow-path C6 as shown in FIGS. 17 to 20. More specifically, the first heat-receiving member 851 is disposed on the inner side of the high heat-conductive member 851 at a position planarly interfering with the cutout 4621 (mount position of the optical device 45) provided on the optical component casing 46.

As shown in FIGS. 17 to 20, the first heat-receiving member 851 has a plurality of plate-shaped fin members 8511 that are mutually stacked in parallel in Z-axis direction. In other words, the plurality of fin members 8511 extend in a direction for the air flowing through the flow-path C6 to be circulated (X-axis direction).

A portion 8511A of the plurality of fin members 8511 planarly interfering with the cutout 4621 provided on the optical component casing 46 (mount position of the optical device 45) projects in −Y-axis direction to exhibit a comb-tooth (in plan view) shape as shown in FIGS. 17 to 20. When the first air-cooling unit 8 is mounted on the optical component casing 46, the portion 8511A of the plurality of fin members 8511 projects to the proximity of the optical device 45 through the opening 8414 of the first flow-path downstream duct 84 and the cutout 4621 provided on the optical component casing 46.

The thickness of the respective fin members 8511 is set at 0.3 mm or more and 2.0 mm or less. The interval between the fin members 8511 is set at 2.0 mm or more and 10.0 mm or less.

As shown in FIGS. 17 to 20, the first heat-conducting member 852 is formed as a tube having capillary-tube structure (wick) and accommodating therein a coolant, where the coolant circulates within the tube to transfer the heat within the first heat-conducting member 852 (so-called heat pipe).

Though not specifically illustrated, the capillary structure of the first heat-conducting member 852 is a sintered wick of powder form. Water is used as the coolant herein. The capillary structure is not limited to sintered wick, but other wicks such as extra-fine line wick of a plurality of fine copper lines and the like, net-like metal mesh wick and groove-wick in which a plurality of grooves are formed inside the tube, may be used. The coolant may not be water, but other coolant such as alcohol may be used.

As show in FIG. 20, the first heat-conducting member 852 is bent to show an L-shaped profile. A first end (evaporative portion) of the first heat-conducting member 852 penetrates the low heat-conductive duct 841 of the first flow-path downstream duct 84 and is connected to the high heat-conductive duct 842 and the first heat-receiving member 851 in a heat-transferable manner. Further, a second end (condensing portion) of the first heat-conducting member 852 is connected to the first heat-radiating member 853 in a heat-transferable manner. The first heat-conducting member 852 guides to the outside the heat transferred from the air flowing in the flow-path C6 directly to the first heat-receiving member 851, the heat transferred from the air flowing in the flow-path C6 to the high heat-conductive duct 842 and the heat transferred to the high heat-conductive duct 842 through the plurality of fin members 8421, so that the heat is transferred to the first heat-radiating member 853.

The first heat-radiating member 853 is made of a high heat-conductive material (see the Table 1 below). A shown in FIG. 4 or FIG. 5, the first heat-conducting member 853 is disposed on the rear side of the exterior casing 2 to radiate the heat transferred via the first heat-conducting member 852.

As shown in FIGS. 17 to 20, the first heat-radiating member 853 has a plurality of plate-shaped fin members 8531 that are mutually stacked in parallel in X-axis direction. As shown in FIGS. 17 to 19, the second end (condensing portion) of the first heat-conducting member 852 penetrates through the respective fin members 8531 from +X-axis side to −X-axis side to be connected with the respective fin members 8531 in a heat-transferable manner.

As shown in FIGS. 5 to 7, the cooling fan 854 is a sirocco fan as shown in FIGS. 5 to 7, which has an intake port 8541 (FIGS. 5, 7) directed in −Z-axis direction at −Y-axis side of the first heat-radiating member 853 and a discharge port 8542 (FIGS. 5, 7) opposed to the first heat-radiating member 853. The cooling fan 854 is driven under the control of the control board 6 to inhale the air within the exterior casing 2 and discharge the air to the first heat-radiating member 853. In other words, the heat transferred to the first heat-radiating member 853 through the heat-transfer channel from the first heat-receiving member 851 to the high heat-conductive duct 842, the first heat-conducting member 852 and the first heat-radiating member 853 is cooled by the cooling fan 854.

Arrangement of Second Air-Cooling Unit

The second air-cooling unit 9 has a circulation fan 91 (FIGS. 6, 7, 10), an auxiliary duct (FIGS. 6, 7, 10, 17), a second flow-path downstream duct 93 and a second heat-radiator 94 (FIGS. 7, 10, 17 to 19).

Incidentally, the arrangement will be sequentially described below from upstream side of the space Ar2 along the second air-flow path.

The circulation fan 91 is a sirocco fan that circulates the air along the loop second air-circulation path within the second sealed structure. As shown in FIG. 6 or FIG. 7, the circulation fan 91 is attached on a below-described fan attaching section of the second flow-path downstream duct 93 so that an intake port thereof (not shown) is directed in +Y-axis direction and a discharge port 911 is directed in −X-axis direction.

Arrangement of Auxiliary Duct

The auxiliary duct 92 is a component made of low heat-conductive material (see the Table 1 below), which guides the air discharged by the circulation fan 91 to the space Ar2. The auxiliary duct 92 has an approximately rectangular parallelepiped shape, where an introduction hole 921 for introducing the air into the inside (FIGS. 6, 7, 17) and a discharge port (not shown) for discharging the internal air to the outside are respectively provided on sides of the duct orthogonal with each other. The auxiliary duct 92 is attached to below-described duct setting section of the second flow-path downstream duct 93 so that the introduction port 921 is connected with the discharge port 911 of the circulation fan 91 and the discharge port is directed in +Y-axis direction. When the auxiliary duct 92 is attached to the auxiliary duct setting section, a flow-path C11 that circulates the air discharged by the circulation fan 91 in −X-axis direction and further in +Y-axis direction to guide the air toward the space Ar2 is defined as shown in FIGS. 6, 7, 10 and 17. The flow-path C11 defines a part of the second air-circulation path within the second sealed structure.

Arrangement of Second Flow-Path Downstream Duct

The second flow-path downstream duct 93 is a component that guides the air flowing from the inside of the space Ar2 to the outside of the space Ar2 toward the air intake of the circulation fan 91. As shown in FIGS. 6, 7, 10, 11, 17 and 19, the second flow-path downstream duct 93 includes a low heat-conductive duct 931 (FIGS. 6, 7, 10, 11 and 17) and a high heat-conductive duct 932 (FIGS. 10 and 17 to 19).

The low heat-conductive duct 931 is made of a low heat-conductive material (see the Table 1 below). As shown in FIGS. 6, 7, 10, 11 and 17, the low heat-conductive duct 931 has an integrated arrangement of a first duct 9311 (FIGS. 10, 11 and 17), a second duct (FIGS. 7, 10, 11 and 17), a third duct 9313 (FIGS. 6, 7, 10 and 17) and an auxiliary duct setting section 9314 (FIGS. 6, 7 and 10). The low heat-conductive duct 931 is attached to the optical component casing 46 to surround three sides of the optical component casing 46 (i.e. +Y-axis side, −Z-axis side and −Y-axis side) and is spaced apart from the optical component casing 46 by a predetermined gap (e.g. 5 to 10 mm) to support the circulation fan 91 and the auxiliary duct 92.

As shown in FIGS. 10, 11 and 17, the first duct 9311 extends in −Z-axis direction from +Y-axis side of the space Ar1 and introduces the air flowing out from the inside of the space Ar2 to the outside of the space Ar2 in −Z-axis direction.

An opening 9311A that is in communication with the space Ar2 through the opening 4622 is provided on the first duct 9311 at a position corresponding to the opening 4622 formed on the optical component casing 46 as shown in FIGS. 11 and 17.

An opening 9311B that extends from a position planarly interfering with the opening 9311A in −Z-axis direction is provided on +Y-axis side of the first duct 9311 as shown in FIG. 11.

As shown in FIGS. 7, 10, 11 and 17, the second duct 9312 extends in −Y-axis direction from a tip end in the extending direction of the first duct 9311 to guide the air introduced by the first duct 9311 in −Y-axis direction.

The third duct 9313 exhibits an approximately L-shape (in plan view) that extends in +X-axis direction from the extension tip end of the second duct 9312, the extension tip end further extending in +Z-axis direction as shown in FIGS. 6, 7, 10 and 17.

A −Y-axis side of a portion 9313A of the third duct 9313 extending in +Z-axis direction works as a fan-attaching section 9313A1 to which the circulation fan 91 is attached, as shown in FIG. 17.

As shown FIG. 17, an opening 9313A2 is provided on the portion 9313A of the third duct 9313 at a position corresponding to the intake port of the circulation fan 91.

As shown in FIGS. 6, 7 and 10, the auxiliary duct setting section 9314 is a rectangular (in plan view) plate-shaped component provided on the inner side of the L-shape of the third duct 9313, which supports the auxiliary duct 92 on −Y-axis side thereof.

An opening 9314A that is in communication with the space Ar2 through the opening 4612P is provided on the auxiliary duct 9314 at a position corresponding to the opening 4612P formed on the optical component casing 46 as shown in FIG. 10. The auxiliary duct 92 is attached to the auxiliary duct setting section 9314 so that a discharge port (not shown) thereof is connected with the opening 9314A at the auxiliary duct setting section 9314. In other words, the air flowing through the flow-path C11 within the auxiliary duct 92 circulates within the space Ar2 through the opening 9314A and the opening 4612P.

The high heat-conductive duct 932 is made of high heat-conductive material (see the Table 1 below), which is a plate member attached to +Y-axis side of the first duct 9311 of the low heat-conductive duct 931 to close the opening 9311B of the first duct 9311 as shown in FIGS. 10 and 17.

When the high heat-conductive duct 932 is attached to the low heat-conductive duct 931, the air flowing from the inside of the space Ar2 toward the outside of the space Ar2 is introduced to the inside of the low heat-conductive duct 931 (the first duct 9311) through the opening 4622 and the opening 9311A, which is inhaled by the circulation fan 91 after passing through a flow-path C12 (i.e. from the first duct 9311 to the second duct 9312 and the third duct 9313) through the opening 9313A2 of the third duct 9313. The flow-path C12 defines a part of the second air-circulation path within the second sealed structure.

In other words, the loop second air-circulation path within the second sealed structure is defined by the above-described flow-paths C11 and C12 and the space Ar2. The polarization converter 423 within the space Ar2 is cooled by circulating the air through the loop second air-circulation path (from the flow-path C11, the space Ar2, the flow-path C12 and back to the flow-path C11) by the circulation fan 91.

Incidentally, though not specifically illustrated, the optical component casing 46 and the second air-cooling unit 9 is provided with a sealed structure where the second air-circulation path is not in communication with the outside by interposing an elastic seal member and the like between the respective components.

Arrangement of Second Heat Radiator

Figure 21:
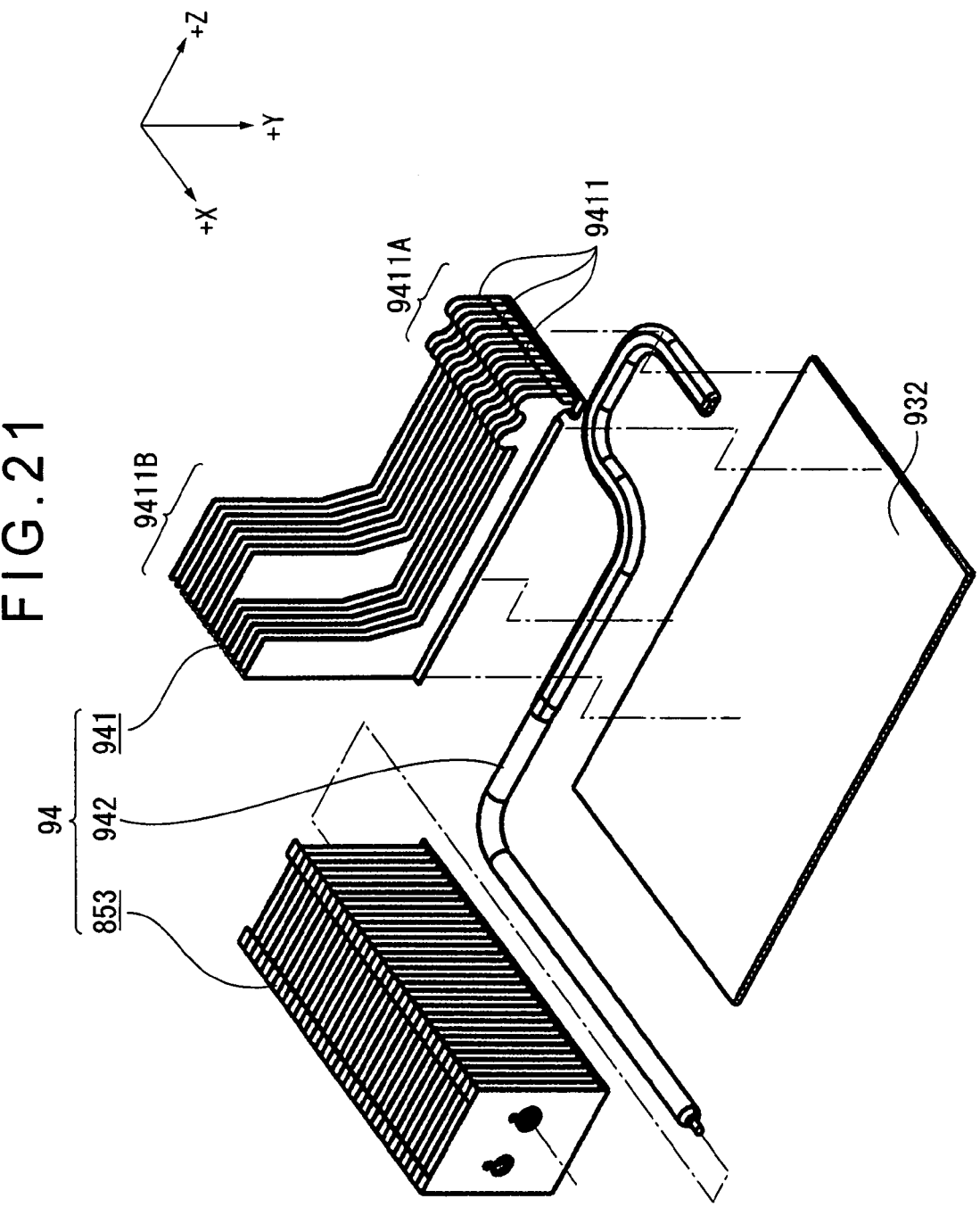
FIG. 21 is an illustration showing an arrangement of a second heat radiator of the aforesaid embodiment.

FIG. 21 is an illustration showing the structure of the second heat radiator 94. Specifically, FIG. 21 is an exploded perspective view showing the lower side of the second heat radiator 94.

As shown in FIGS. 17 to 19 and FIG. 21, the second heat radiator 94 is a device that is connected with the high heat-conductive duct 932 of the second flow-path downstream duct 93. The second heat radiator 94 receives the heat of the air flowing through the second air-circulation path (the flow-path C12) within the second sealed structure and radiates the heat to the outside of the second sealed structure. As shown in FIGS. 17 to 19, the second heat radiator 94 includes a second heat-receiving member 941, a second heat-conducting member 942 (FIG. 21), the first heat-radiating member 853 and the cooling fan 854 (FIGS. 5-7). Incidentally, as shown in FIGS. 5 to 7 and FIGS. 17 to 19, the first heat-radiating member 853 and the cooling fan 854 are respectively used in common for the heat-radiating member and the cooling fan constituting the first heat-radiator 85 and the heat-radiating member and the cooling fan constituting the second heat-radiator 94.

The second heat-receiving member 941 is made of a highly heat-conductive material (see the Table 1 below), which is connected to the inner side (−Y-axis side) of the high heat-conductive duct 842 in a heat-transferable manner and to receive the heat of the air flowing through the flow-path C12 as shown in FIGS. 17, 19 and 21. More specifically, the second heat-receiving member 941 is disposed on the inner side of the high heat-conductive member 932 at a position planarly interfering with the cutout 4622 (mount position of the polarization converter 423) provided on the optical component casing 46.

As shown in FIGS. 18, 19 and 21, the second heat-radiating member 941 has a plurality of plate-shaped fin members 9411 that are mutually stacked in parallel in X-axis direction. In other words, the plurality of fin members 9411 extend in a direction for the air flowing through the flow-path C12 to be circulated (Z-axis direction).

A portion 9411A of the plurality of fin members 9411 planarly interfering with the cutout 4622 provided on the optical component casing 46 (mount position of the optical device 423) projects in −Y-axis direction to exhibit a comb-tooth (in plan view) shape as shown in FIGS. 17 to 19 and FIG. 21. When the second air-cooling unit 9 is mounted on the optical component casing 46, the portion 9411A of the plurality of fin members 9411 projects to the proximity of the optical device 423 through the opening 9311A of the first flow-path downstream duct 9311 and the opening 4622 provided on the optical component casing 46.

A portion 9411B of the plurality of fin members 9411 corresponding to the second duct 9312 projects in −Y-axis direction as shown in FIGS. 17 to 19 and FIG. 21. When the second air-cooling unit 9 is assembled, the portion 9411B of the plurality of fin members 9411 projects in the extending direction of the second duct 9312.

The thickness of the respective fin members 9411 is set at 0.3 mm or more and 2.0 mm or less. The interval between the fin members 9411 is set at 2.0 mm or more and 10.0 mm or less.

The second heat-conducting member 942 is a heat-pipe containing sintered wick of powder form as in the first heat-conducting member 852. The capillary-pipe structure of the second heat-conducting member 942 may not be sintered wick, but other wicks such as extra-fine line wick, metal mesh wick and groove-wick may be used.

As shown in FIG. 21, the second heat-conducting member 942 is bent to show an L-shape with a first end (evaporative portion) of the L-shape being bent to show a C-shape (in plan view). The first end (evaporative portion) of the second heat-conducting member 942 penetrates the low heat-conductive duct 931 of the second flow-path downstream duct 93 and is connected to the high heat-conductive duct 932 and the second heat-receiving member 941 in a heat-transferable manner. The second end (condensing portion) of the second heat-conducting member 942 penetrates through the respective fin members 8531 of the first heat-radiating member 853 from −X-axis side to +X-axis side to be connected with the respective fin members 8531 in a heat-transferable manner. In other words, the second heat-conducting member 942 guides to the outside the heat transferred from the air flowing in the flow-path C12 directly to the second heat-receiving member 941, and the heat transferred from the air flowing in the flow-path C12 to the high heat-conductive duct 842, so that the heat is transferred to the first heat-radiating member 853.

Then, both of the heat, i.e. (1) the heat transferred through the heat-transfer channel (from the first heat-receiving member 841 and the high heat-conductive duct 942 to the first heat-conductive member 852 and further to the first heat-radiating member 853) and (2) the heat transferred through another heat-transfer channel (from the second heat-receiving member 941 and the high heat-conductive duct 932 to the second heat-conductive member 942 and further to the first heat-radiating member 853) is cooled by the cooling fan 854.

The high heat-conductive material and the low heat-conductive material may be the material shown in the Table 1 below. As shown in Table 1, the high heat-conductive material is preferably a material of which thermal conductivity is 42 W/(m·K) or more and the low heat-conductive material is preferably a material of which thermal conductivity is 0.9 W/(m·K) or less.

TABLE 1

| | | Material Name | Thermal Conductivity (W/(m · K)) |
|---|---|---|---|
| High Heat-Conductive Material | Metal | Steel (Pure Fe) | 80 |
| | | Aluminum (Pure Al) | 237 |
| | | Copper (Pure Cu) | 398 |
| | | A5052 (Al alloy) | 138 |
| | | ADC12 (Al alloy) | 96 |
| | | AZ91D (Mg alloy) | 72 |
| | | Carbon Steel | 42 |
| | | SUS (Stainless Steel) | 16 |
| Low Heat-Conductive Material | Resin | Acryl | 0.21 |
| | | Epoxy | 0.3 |
| | | Polycarbonate | 0.23 |
| | | ABS | 0.9 |
| | | Polypropylene | 0.2 |
| | Heat Insulator | Glass Wool | 0.034 |
| | | Expanded Polystyrene | 0.038 |
| | | Rigid Urethane Foam | 0.018 |

Arrangement of Intra-Casing Cooling Device

The intra-casing cooling device 10 cools the components (the control board 6, the light source device 41, the power source unit 5 and the like) outside the first sealed structure and the second sealed structure. As shown in FIGS. 3 to 7, the intra-casing cooling device 10 includes a light-source cooling fan 101 (FIGS. 6 and 7), a power-source cooling fan 102 and an exhaust fan 103 (FIGS. 3 to 6).

As shown in FIG. 6 or FIG. 7, the light-source cooling fan 101 is a sirocco fan attached on a first end of −Y-axis side of the component casing body 4612 connected with the light source housing 4611 so that an intake port 1011 is directed in −Y-axis direction and a discharge port 1012 is directed in +Z-axis direction. The light-source cooling fan 101 is driven under the control of the control board 6 to inhale the cooling air outside the exterior casing 2 through the light source air inlet 223 provided on the lower case 22 and discharge the air in +Z direction. As shown in FIGS. 6 and 7, the air discharged from the light-source cooling fan 101 is introduced into the inside of the lamp housing 413 through a flow-path C21 intercommunicating the inside and the outside of the lamp housing 413 by the air intake 4131 (FIG. 6) and the opening 4132 (FIG. 7) provided on the lamp housing 413 of the light source device 41 to cool the light source lamp 411 and the reflector 412.

The light-source cooling fan 102 is, as shown in FIGS. 3 to 7, an axial-flow fan, which is disposed at a corner (located at −Z-axis side and −X-axis side) of the interior of the exterior casing 2 so that an air intake 1021 thereof is directed in −Z-axis direction and a discharge outlet 1022 is directed in +Z-axis direction. The light-source cooling fan 102 is driven under the control of the control board 6 to inhale the cooling air outside the exterior casing 2 through the power source air inlet 227 and discharge the air in +Z direction as shown in FIGS. 4 and 5. The air discharged by the power-source cooling fan 102 is introduced from an opening provided on −Z-axis side of the shield member 51 into the inside of the shield member 51 through a flow-path C22 intercommunicating the inside and the outside of the shield member 51 by the shield member 51 of the power source unit 5 to cool the power source block and the lamp-driving block.

As shown in FIGS. 3 to 6, the exhaust fan 103 is an axial-flow fan, which is disposed at a corner (located at +Z-axis side and −X-axis side) of the interior of the exterior casing 2 so that an air intake 1031 (FIG. 6) thereof is directed in −Z-axis direction and inclined in +X-axis direction by a predetermined angle relative to the XY plane. The exhaust fan 103 is driven under the control of the control board 6 to inhale the air around the exhaust fan 103.

For instance, the exhaust fan 103 inhales the air delivered by the cooling fan 854 of the heat-radiators 85 and 94 and delivered to the proximity of the light source housing 4611 after passing through the first heat-radiating member 853 and further through the control board 6 and the high heat-conductive ducts 842 and 932 to cool the components 853, 6, 842 and 932.

Further, for instance, the exhaust fan 103 inhales the air inside of the light source housing 4611 through an opening (not shown) provided on −X-axis side of the light source housing 4611 as shown in FIGS. 5 and 6. In other words, (1) the air introduced into the lamp housing 413 through the flow-path C21 by the light-source cooling fan 101 and heated by the reflector 412 and (2) the air delivered to the interior of the light source housing 4611 through the opening 4611B provided on +X-axis side of the light source housing 4611 are inhaled by the exhaust fan 103.

Further, for instance, the exhaust fan 103 inhales the air inside the shield member 51 through an opening provided on +Z-axis side of the shield member 51 as shown in FIGS. 4 and 5. In other words, the air introduced into the inside of the shield member 51 through the flow-path C22 by the power-source cooling fan 102 and heated by the power source block and the lamp driving block is inhaled by the exhaust fan 103.

The air discharged by the exhaust fan 103 is rectified by the louver 234 and discharged to the outside of the exterior casing 2 through the exhaust hole 233 of the exterior casing 2.

Arrangement of Control Board

As shown in FIG. 3, the control board 6 is a circuit board on which circuit elements such as a CPU (Central Processing Unit) are installed, which is disposed above the optical unit 4 through the respective high heat-conductive ducts 842 and 932. The control board 6 controls the operation of the optical unit 4 (the light source lamp 411, the liquid crystal panel 451), the power source unit 5, the sealed circulation air-cooling unit 7 (the circulation fans 82 and 91, the cooling fan 854), the intra-casing cooling device 10 (the light-source cooling fan 101, the power-source cooling fan 102, the exhaust fan 103) and the like.

According to the above-described first exemplary embodiment, following advantages can be obtained.

According to the present embodiment, since the optical device 45 and the polarization converter are accommodated within the spaces Ar1 and Ar2 inside the optical component casing 46 respectively constituting the first sealed structure and the second sealed structure, adhesion of dust and lamp-black on the respective optical components 45 and 423 can be prevented, thereby securing stable image quality of the image projected by the projector 1 for a long time. Accordingly, the life of the projector 1 can be prolonged.

The first heat radiator 85 of the first sealed structure includes the first heat-receiving member 851 and the first heat-conducting member 852. The first heat-receiving member 851 receives the heat of the air inside the first sealed structure and the first heat-conducting member 852 transfers the heat received by the first heat-receiving member 851 from the inside of the first sealed structure toward the outside of the first sealed structure. Similarly, the second heat radiator 94 of the second sealed structure transfers the heat received by the second heat-receiving member 941 to the inside of the second sealed structure to the outside of the second sealed structure by the second heat-conducting member 942. Accordingly, the heat of the air inside the respective sealed structures can be transferred to the outside of the sealed structures by the heat radiators 85 and 94, so that the air within the respective sealed structures can be efficiently cooled. Thus, the optical device 45 and the polarization converter 423 can be efficiently cooled.

Further, it is not necessary to form the component of the sealed structure with metal material, so that the weight of the projector 1 itself can be reduced.

Since the second ends of the respective heat-conducting members 852 and 942 are installed to the rear side (vacant space inside the projector 1), the respective heat-conducting members 852 and 942 can be cooled by the first heat-radiating member 853 and the cooling fan 854 at the vacant space on the rear side. In other words, since the second ends of the heat-conducting members 852 and 942 can be installed at various locations, the respective components 853 and 854 for cooling the second ends of the respective heat-conducting members 852 and 942 can be freely located, so that design freedom of the projector 1 can be improved.

The respective heat-conducting members 852 and 942 are made of heat-pipe using circulation of coolant. Accordingly, as compared with an arrangement in which a heat-conducting member utilizing thermal conduction is used as the heat-conducting member, the heat resistance between the first end (evaporative portion) and the second end (condensing portion) becomes closer to zero, so that approximately the same cooling effect as direct cooling of the first end can be obtained by cooling the second end. In other words, the heat transfer within the respective heat-conducting members 852 and 942 can be rapidly conducted, thereby improving the cooling efficiency of the air within the respective sealed structures.

Further, since the heat-conducting members 852 and 942 are provided by a heat pipe, any attitude of the projector 1 such as normal-mount attitude (mounted on a setting surface on a desk, for instance), hang attitude (suspended from ceiling and the like to be upside down relative to the normal-mount attitude) and inclined attitude in order to adjust the position of the projected image is possible while keeping excellent cooling efficiency of the air within the respective sealed structures.

Further, since the capillary structure of the respective heat-conducting members 852 and 942 are formed by sintered wick, the heat resistance between the first end and the second end can be set sufficiently low as compared with the other wicks (extra-fine line wick, metal mesh wick, groove wick and the like) and the heat can be efficiently transferred to the coolant by virtue of the excellent heat conductivity of the wick itself. Accordingly, heat transfer within the heat-conducting members 852 and 942 can be more rapidly conducted and the cooling efficiency of the air within the respective sealed structures can be further improved.

Further, since the respective heat-receiving members 851 and 941 are placed at a position planarly interfering with the cutout 4621 and the opening 4622 within the flow-path downstream ducts 84 and 93, the air heated by the optical device 45 and the polarization converter 423 are directly blown to the respective heat-receiving members 851 and 941. In other words, after the heat of the air immediately after being heated by the respective optical components 45 and 423 is received by the respective heat-receiving members 851 and 941, the heat is transferred to the outside of the respective sealed structures by the heat-conducting members 852 and 942, so that temperature raise of the air within the sealed structures can be reduced and the air can be efficient cooled.

Incidentally, when the optical device 45 and the polarization converter 423 of which heat values are different are placed within the same air-circulation path, it is difficult to efficiently cool the optical components 45 and 423 on account of heat transfer and thermal interference from the other optical component (the optical device 45 against the polarization converter 423, for instance).

Since two sealed structures are provided corresponding to the objects to be cooled, i.e. the optical components 45 and 423, by placing 45 and 423 of which heat values are different within the independent air-circulation paths of the sealed structures, the optical components 45 and 423 can be efficiently cooled by the air flowing through the air-circulation paths while avoiding heat transfer and interference from the other optical component.

Since the heat radiators 85 and 94 include the first heat radiator to be connected to the second ends of the heat-conducting members 852 and 942, the heat transferred to the second end of the heat-conducting members 852 and 942 can be efficiently radiated by the first heat-radiating member 853. Further, since the heat-radiating member of the heat radiators 85 and 94 is provided by the same first heat-radiating member 853, as compared with an arrangement in which the heat radiators 85 and 94 are provided with separate heat-radiating members, the component can be omitted by employing the first heat-radiating member 853 as a common component, thereby reducing production cost, size and weight of the projector 1.

Since the first sealed structure include the heat exchanger 81 having the heat-receiving-side heat-conducive member 81111 and the heat-radiating-side heat-conductive member 8112, the air within the first sealed structure can be further efficiently cooled with the use of the first heat-radiator 85 and the heat exchanger 81.

Since the heat exchanger 81 include the cooling fan 814 and the cooling fan 814 cools the plurality of fin members 8112B of the heat-radiating-side heat-conductive member 8112, cooling efficiency of the air within the first sealed structure by the heat exchanger 81 can be further improved.

The heat-receiving members 851 and 941 of the respective heat radiators 85 and 94 are respectively provided within the flow-path downstream ducts 84 and 93. Accordingly, as compared with an arrangement in which the respective heat-receiving members are connected to the outer surface of the flow-path downstream ducts 84 and 93 in a heat-transferable manner, it is not necessary to enlarge the space within the exterior casing 2 for providing the mount space of the respective heat-receiving member, so that the size of the projector 1 can be reduced.

The thickness of the respective fin members 8511 and 9411 of the heat-receiving members 851 and 941 is set at 0.3 mm or more and 2.0 mm or less. The interval between the fin members 8511 and 9411 is set at 2.0 mm or more and 10.0 mm or less. Accordingly, the surface area of the respective heat-receiving members 851 and 941 can be enlarged and air heat absorption inside the sealed structure can be increased, thereby improving the cooling efficiency of the air within the respective sealed structures. Further, the resistance for the air to flow through the flow-paths C6 and C12 within the heat-receiving members 851 and 941 can be reduced, thereby efficiently circulating the air flowing through the respective air-circulation paths.

Since the portions 8511A and 9411A project to the proximity of the optical components 45 and 423, the heat of the air heated by the respective optical components 45 and 423 can be further efficiently absorbed.

The respective heat radiators 85 and 94, the circulation fans 82 and 91, and the optical component casing 46 are arranged in an order of the heat radiators 85 and 94, the circulation fans 82 and 91 and the optical component casing 46 along the air-circulation direction within the air-circulation paths inside the sealed structures. Accordingly, the circulation fans 82 and 91 can inhale the air cooled by the heat radiators 85 and 94 and discharge the air to the optical components 45 and 423 accommodated in the spaces Ar1 and Ar2 within the optical component casing 46. In other words, the air can be delivered to the optical components 45 and 423 at a low temperature after being cooled by the heat radiators 85 and 94, thereby efficiently cooling the optical components 45 and 423.

Since the circulation fans 82 and 91 are sirocco fans, sufficient discharge pressure and velocity of the discharged air can be obtained, thereby efficiently cooling the optical components 45 and 423.

The heat-receiving-side duct 812, the flow-path upstream duct 83, the low heat-conductive duct 841, the auxiliary duct 92 and the low heat-conductive duct 931 are made of low heat-conductive material with thermal conductivity of 0.9 W/(m·K). By constructing the above components 812, 83, 841, 92 and 931 with a material of which thermal conductivity is sufficiently low, the heat of the air outside the sealed structures and the heat of the components provided outside the sealed structures can be prevented from being transferred to the air flowing through the respective air-circulation paths via the members 812, 83, 841, 92 and 931. In other words, sufficient cooling efficiency of the air within the sealed structures can be maintained.

Since the flow-path upstream duct 83 (the base plate 831), the low heat-conductive duct 841 and the low heat-conductive duct 931 are attached on the optical component casing 46 in a manner spaced apart by a predetermined interval (5 to 10 mm, for instance), the heat transferred from the optical components such as the light source device 41 and the like to the optical component housing 46 can be securely prevented from being transferred to the air inside the sealed structures through the members 831, 841 and 931.

Further, since a structure for efficiently cooling the respective optical components 45 and 423 is employed, it is not necessary to excessively raise the speed of rotation of the circulation fans 82 and 91, thereby reducing the noise level of the projector 1.

The flow-path downstream ducts 84 and 93 are provided with the high heat-conductive ducts 842 and 932 made of high heat-conductive material with sufficient high thermal conductivity of 42 W/(m·K) at a position planarly interfering with the cutout 4621 and the opening 4622 of the optical component casing 46. In other words, the high heat-conductive ducts 842 and 932 are provided at a position to which the air heated by the respective optical components 45 and 423 placed in the spaces Ar1 and Ar2 within the optical component casing 46 is blown via the cutout 4621 and the opening 4622 of the optical component casing 46, the opening 8414 of the low heat-conductive duct 841 and the opening 9311A of the low heat-conductive duct 931. Accordingly, the heat of the air flowing through the flow-paths C6 and C12, in other words, the heat of the air heated by the optical components 45 and 423 housed inside the spaces Ar1 and Ar2 within the optical component housing 46 can be radiated to the outside of the sealed structures through the high heat-conductive ducts 842 and 932.

Further, the first end of the heat-conducting members 852 and 942 of the heat radiators 85 and 94 is connected in a heat-transferable manner to the high heat-conductive ducts 842 and 932 as well as the heat-receiving members 851 and 941, the heat of the high heat-conductive ducts 842 and 932 can also be transferred to the outside of the sealed structure by the heat-conducting members 852 and 942 in the same manner as the heat-receiving members 851 and 941.

Accordingly, the temperature of the air flowing through the air-circulation paths within the sealed structures can be set sufficiently low, thereby efficiently cooling the optical components 45 and 423.

Second Exemplary Embodiment

A second exemplary embodiment of the invention will be described below with reference to the attached drawings.

In the following description, the same reference numeral will be attached to the same structures and components as the above-described first exemplary embodiment and detailed description thereof will be omitted or simplified.

Figure 22:
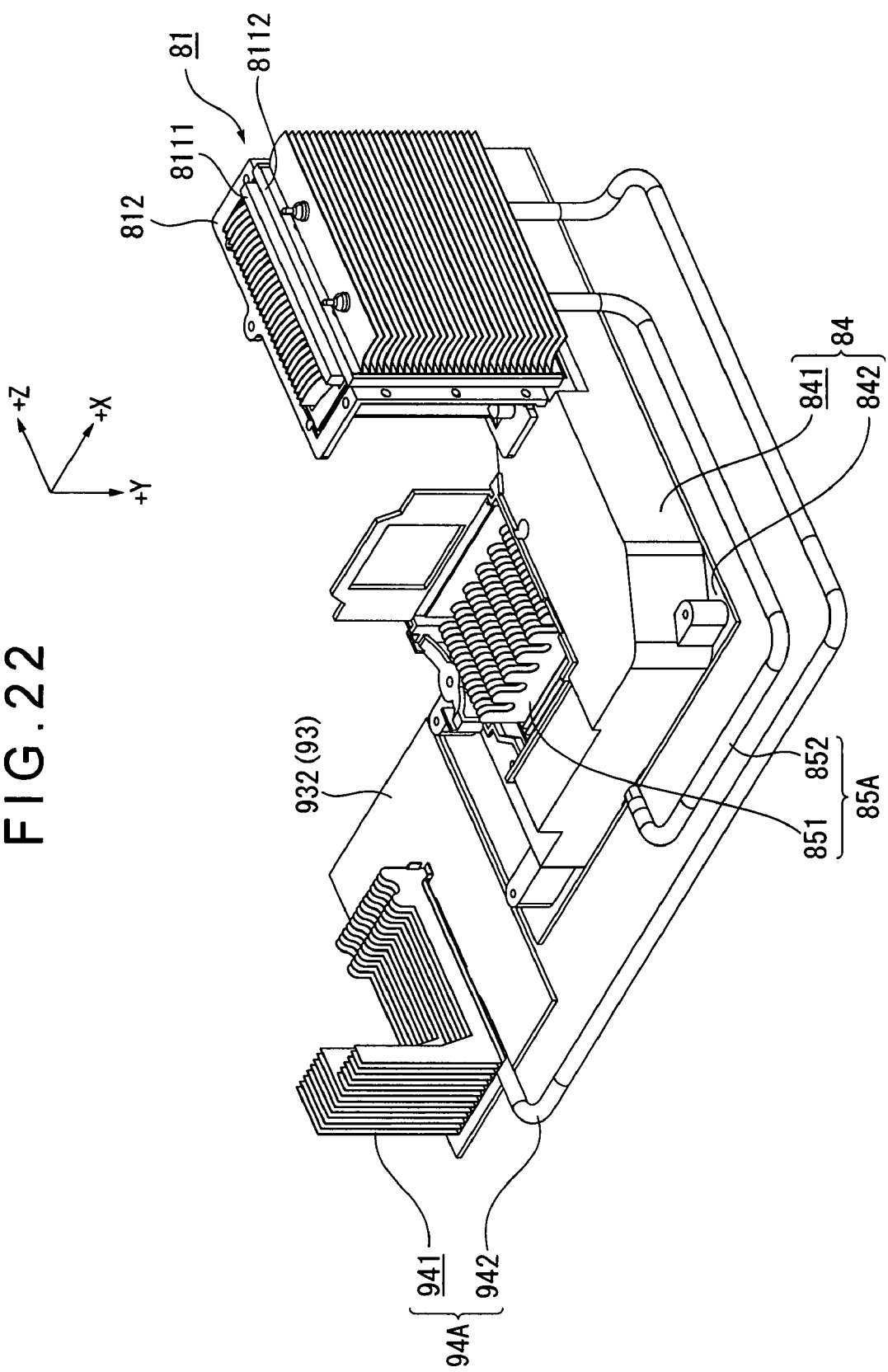
FIG. 22 is an illustration showing an arrangement of the first heat radiator and the second heat radiator of a second exemplary embodiment.

FIG. 22 is an illustration showing an arrangement of the first heat radiator 85A and the second heat radiator 94A of the second exemplary embodiment. Specifically, FIG. 22 is a perspective view showing the lower side of the first heat radiator 85A and the second heat radiator 94A.

As shown in FIG. 22, the present embodiment differs from the first exemplary embodiment in that the first heat-radiating member 853 and the cooling fan 854 are omitted. The rest of the arrangement is the same as the first exemplary embodiment.

In the present embodiment, the second ends (condensing portion) of the heat-conducting members 852 and 942 of the first heat radiator 85A and the second heat radiator 94A are connected to the heat-radiating-side heat-conductive member 8112 of the heat exchanger 81 in a heat-transferable manner as shown in FIG. 22. More specifically, the second ends (condensing portion) of the heat-conducting members 852 and 942 penetrate through the respective fin members 8112B of the heat-radiating-side heat-conductive member 8112 from +Y-axis side to −Y-axis side to be connected with the respective fin members 8112B in a heat-transferable manner.

According to the above arrangement, (1) the heat transferred through the heat transfer path from the first heat-receiving member 851 and the high heat-conductive duct 842 to the first heat-conducting member 852 and (2) the heat transferred through the heat transfer path from the second heat-receiving member 941 and the high heat-conductive duct 932 to the second heat-conducting member 942 are transferred to the heat-radiating-side heat-conductive member 8112 and are cooled by the cooling fan 814.

According to the above-described second exemplary embodiment, following advantages can be obtained as well as the same advantages as the first exemplary embodiment.

In the present embodiment, the second ends of the heat-conducting members 852 and 942 of the heat radiators 85A and 94A are connected to the heat-radiating-side heat-conductive member 8112 of the heat exchanger 81 in a heat-transferable manner. Accordingly, the mechanism for cooling the second end of the heat-conducting members 852 and 942 and the mechanism for cooling the heat-receiving-side heat-conductive member 8111 of the heat exchanger 81 can be provided by the same component. Accordingly, the first heat-radiating member 853 and the cooling fan 814 can be omitted and the cost, size and weight of the projector 1 can be reduced.

Note that the scope of the invention is not restricted to the above-described exemplary embodiment, but includes modifications and improvements as long as an object of the invention can be achieved.

Though two sealed structures having mutually independent air-circulation paths are provided in the above exemplary embodiments, only one sealed structure (with only one air-circulation path) may be provided. Alternatively, more than two sealed structures (more than two mutually independent air-circulation paths) may be provided. When only one sealed structure is provided, only one optical component (for instance, the optical device 45) may be housed within the sealed structure, or, alternatively, a plurality of optical components may be housed therein. When more than two sealed structures are provided, only one optical component may be housed within each of the sealed structures, or, alternatively, more than one optical components may be housed within each of the sealed structures. In the exemplary embodiments, optical component other than the optical device 45 may be housed within the first sealed structure and optical component other than the polarization converter 423 may be housed within the second sealed structure.

Further, optical components other than the optical device 45 and the polarization converter 423 may be used as the optical component to be cooled.

Though the heat-conductive members 852 and 942 are constructed by a heat pump, a heat-conducting member utilizing thermal conduction where the heat is transferred within the heat-conducting member without accompanying mass transfer, or a heat-conducting member such as thermosiphon where a coolant is circulated within a tube by virtue of gravity may alternatively be employed.

The arrangement of the heat exchanger 81 is not limited to that described in the exemplary embodiments. For instance, a thermoelectric transducer such as a Peltier element may be interposed between the heat-receiving-side heat-conductive member 8111 and the heat-radiating-side heat-conductive member 8112. Specifically, endothermic side of the Peltier element is coupled with the plate body 8111A of the heat-receiving-side heat-conductive member 8111 in a heat-transferable manner and heat-radiation side of the Peltier element is coupled to the plate body 8112A of the heat-radiating-side heat-conductive member 8112 in a heat-transferable manner. According to the above arrangement, the heat of the air within the sealed structure can be further efficiently cooled.

Though the heat exchanger 81 is provided only on the first sealed structure in the above exemplary embodiments, the heat exchanger 81 may be respectively provided on both of the first sealed structure and the second sealed structure, or, alternatively, the heat exchanger 81 may be provided only on the second sealed structure.

Though the light source device 41 is a discharge-emission light source device in the above exemplary embodiments, various solid light-emitting elements such as laser diode, LED (Light Emitting Diode), Organic EL (Electro-Luminescence) element, silicon light-emitting element and the like may alternatively be used.

Though a single light source device 41 is used and the light from the light source device 41 is separated into three color lights by the color-separating optical system 43 in the above exemplary embodiments, the color-separating optical system 43 may not be provided and three solid light-emitting elements respectively emitting the three color lights may be used as the light source device.

Though the cross dichroic prism 453 is used as the color-combining optical device in the above exemplary embodiments, a plurality of dichroic mirrors may alternatively be used to combine the color lights.

Though the projector 1 is a three-plate projector having three liquid crystal panels 451 in the above exemplary embodiments, the projector 1 may be a single-plate projector having a single liquid crystal panel. Alternatively, the projector 1 may be a projector having two liquid crystal panels or a projector having more than three liquid crystal panels.

In the above-described exemplary embodiments, although a transmissive liquid crystal panel having different light-incident side and light-irradiation side is used, a reflective liquid crystal panel having common light-incident side and light-irradiation side may be used.

In the above exemplary embodiments, the liquid crystal panel is used as the optical modulator. However, an optical modulator other than a liquid crystal panel may be used.

In the above exemplary embodiments, the front-type projector that projects an image in a direction for observing a screen is taken as an example, but the invention may be applied to a rear-type projector that projects an image in a direction opposite to the direction for observing the screen.

Although the best mode and the like for implementing the invention have been disclosed above, the invention is not limited thereto. In other words, while the invention has been mainly illustrated and described on the specific exemplary embodiment, a person skilled in the art can modify the arrangements such as shape, material, quantity and the like of the above-described exemplary embodiment without departing from the technical idea and scope of the invention.

Therefore, the description limiting the shapes, materials and the like disclosed above is intended to be illustrative for easier understanding but not to limit the invention, hence the invention includes a description using a name of the components without a part of or all of the limitation on the shapes, materials and the like.

The projector according to the present invention is capable of securing the image quality of the projected image for a long time while efficiently cooling the optical components, which is applicable to a projector used for presentation purpose and home theater.

What is claimed is:

1. A projector, comprising:
   an optical component;
   a sealed structure including a plurality of sealed structures, each of the plurality of sealed structures mutually independently defining a loop air-circulation path in which air is circulated within which the optical component is disposed, the sealed structure including:
   an optical component casing that houses the optical component therein, the optical component casing having an inlet for the air to flow into the optical component casing and an outlet for the air to flow out of the optical component casing;
   a plurality of ducts that introduces the air into the optical component casing through the inlet and re-introduces the air flowing out of the optical component casing through the outlet into the optical component casing through the inlet; and
   a heat radiator having a heat-receiving member disposed inside the sealed structure to receive the heat of the air within the sealed structure, and a heat-conducting member that penetrates an inside and an outside of the sealed structure, the heat-conducting member having a first end disposed inside the sealed structure and a second end disposed outside the sealed structure, the first end coupled to the heat-receiving member in a heat-transferable manner to transfer the heat of the heat-receiving member to the second end, wherein the heat radiator has a heat-radiating member being coupled to the second end of the heat-conducting member to radiate the heat transferred via the heat-conducting member, and
   the heat radiator of each of the plurality of sealed structures having the heat-radiating member in common; and
   a circulation fan that circulates the air within the loop air-circulation path.

2. The projector according to claim 1, wherein the heat-conducting member is a heat-pipe including:
   a tube;
   a capillary structure provided in the tube; and
   a coolant housed within the tube,
   the coolant circulating in the tube to transfer the heat within the heat-conducting member.

3. The projector according to claim 2, wherein the capillary structure of the heat-conducting member is provided by a sintered wick.

4. The projector according to claim 1, wherein the plurality of ducts includes a flow-path downstream duct that is connected with the outlet of the optical component casing, and
   the heat-receiving member is disposed within the flow-path downstream duct at a position planarly interfering with the outlet.

5. The projector according to claim 1, wherein the sealed structure includes a heat exchanger including: a heat-receiving-side heat-conductive member that faces the inside of the sealed structure and receives the heat of the air within the sealed structure; and a heat-radiating-side heat-conductive member that faces the outside of the sealed structure and is coupled with the heat-receiving-side heat-conductive member in a heat-transferable manner to radiate the heat of the heat-receiving-side heat-conductive member to the outside of the sealed structure.

6. The projector according to claim 5, wherein the heat-radiating-side heat-conductive member includes a plurality of fins, and
   the heat exchanger includes a cooling fan that delivers cooling air to the plurality of fins or inhales the air near the plurality of fins.

* * * * *